United States Patent
Faccone et al.

[19]

[11] Patent Number: 6,082,625
[45] Date of Patent: Jul. 4, 2000

[54] TRANSIT VEHICLE HEATER

[75] Inventors: Angelo Faccone, Burnaby; Garry J. Anderson, N. Vancouver, both of Canada

[73] Assignee: Teleflex (Canada) Ltd., Canada

[21] Appl. No.: 09/210,575

[22] Filed: Dec. 14, 1998

Related U.S. Application Data

[63] Continuation of application No. 08/688,645, Jul. 29, 1996, Pat. No. 5,878,950.

[51] Int. Cl.[7] .................................................... B60H 1/02
[52] U.S. Cl. ................................. 237/12.3 C; 237/2 A
[58] Field of Search ......................... 237/12.3 C, 2 A, 237/12.3 R, 12.3 A; 236/91 F

[56] References Cited

U.S. PATENT DOCUMENTS

| | | | |
|---|---|---|---|
| 3,362,637 | 1/1968 | Cornell | 237/2 A |
| 4,519,772 | 5/1985 | Mittmann | 237/2 A |
| 4,858,825 | 8/1989 | Kawamura | 237/2 A |
| 4,905,893 | 3/1990 | Kiskis | 237/2 A |
| 4,927,077 | 5/1990 | Okada | 237/2 A |
| 4,940,041 | 7/1990 | Riedmaier et al. | 126/110 R |
| 5,025,985 | 6/1991 | Enander | 237/2 A |
| 5,046,663 | 9/1991 | Bittmann | 237/12.3 C |

Primary Examiner—Harold Joyce
Assistant Examiner—Derek S. Boles
Attorney, Agent, or Firm—Liniak, Berenato, Longacre & White, LLC

[57] ABSTRACT

A supplementary vehicle heater is provided which includes a burner, a heat exchanger, a coolant conduit connected to the heat exchanger, and a coolant pump connected to the conduit. There are controls which are operatively connected to the burner and the coolant pump which operate the heater in a first mode when the engine is stopped to preheat the engine or keep the engine warm. The controls operate the heater in a second mode when the engine is running to improve heating of vehicle interior. Preferably the controls include automatic controls which engine coolant temperature. The controls cause the burner and pump to function when the engine is running and the coolant temperature is below preset temperature.

17 Claims, 25 Drawing Sheets

TRANSIT VEHICLE HEATER

This is a continuation of application Ser. No. 08/688,645 now U.S. Pat. No. 5,878,950 Jul. 29, 1996.

BACKGROUND OF THE INVENTION

This invention relates to vehicle heaters of the type which use a burner as a source of heat and, in particular, to such a heater particularly adapted for use in buses and other transit vehicles.

Conventionally vehicle interiors are heated by the engine of the vehicle. Hot coolant from the engine is circulated through a heat exchanger and one or more fans are used to circulate air heated by the heat exchanger through the interior of the vehicle. However, such heaters are not always sufficient for the heating requirements of some vehicles, such as buses and other transit vehicles which have a large interior volume. The need for another heater is increased for certain types of engines which have relatively low heat output such as four cycle diesel engines.

In addition, the vehicle engines are only an adequate source of heat after they come fully up to operating temperature and only as long as they continue to operate. Accordingly an additional source of heat may be desirable for heating the vehicle while the engine is still cold and for periods of time when the engine is shut off.

Another type of auxiliary heater is commonly employed in vehicles, typically large diesel powered vehicles, to preheat the engine prior to starting and to keep the engine warm when the vehicle is shut off. Such heaters make diesel powered vehicles significantly easier to start and reduce initial wear on various engine components including the starting system and moving components which initially may not receive adequate lubrication when the engine is cold.

At least two types of auxiliary heaters therefore are commonly available for vehicles. One is an auxiliary space heater which usually burns the engine fuel in a burner and circulates the heat to the interior by means of a fluid heated in a heat exchanger adjacent the burner. The second is a preheater to initially warm the engine or keep the engine warm while the engine is shut off. Such preheaters may also include burners operating on the engine fuel and are typically connected to the engine cooling system to initially warm the coolant or keep the coolant warm.

Auxiliary space heaters for vehicles may in fact be necessary for transit vehicles. On the other hand, preheaters may only be necessary in extremely cold climates. However, as indicated above, they may make such vehicles much easier to start, improve the life of the engine and other vehicle components and can cut emissions by allowing the engine to be shut off when not required. They also save fuel costs since the engine need not operate to provide heat. Vehicle purchasers however are often faced with the necessity of ordering two separate heaters in the vehicle, a preheater and an supplemental, fuel-fired space heater.

Another problem with the space heaters is encountered due to the continuous operation of their circulating pumps. These are typically electrically powered. The pump and motor have a limited service life. In many prior art heaters the pump circulates continuously as long as the auxiliary space heater is in operation. Eventually the pump and/or motor fail, possibly requiring the vehicle to be out of service until the components can be replaced or repaired and increasing the overall operating costs of the vehicle.

However previous attempts to prolong the life of the coolant pump by shutting the heater off have been unsuccessful. This has typically been done by shutting the heater off through external relay logic when the heater enters a standby sub-state after the coolant is heated to a preset level, typically 85° C. These attempts proved to be unsuccessful because shutting the heater off in this way undermines the heater's ability to diagnose system problems through its diagnostic system, the heater's ability to automatically shut itself off when certain types of errors are encountered and the integrity of the heater data log is undermined by filling it with turn on and turn off events.

The coolant pump tends to run excessively long because the auxiliary heater tends to have a relatively light duty cycle when the engine is running because the coolant is already heated by the engine. The heater tends to therefore remains in a standby mode or sub-state for the majority of its run time with the coolant pump constantly circulating the hot coolant and with the burner off and monitoring the coolant temperature. The duty cycle of the pump can approach 100% of the time.

One problem associated with prior art preheaters is encountered with fleet operations where driver turn-over is high and driver training is typically low. Automation, in the form of a timer, can facilitate the preheating operation. However automation has not typically existed for a supplemental heater.

Another problem associated with preheaters is that they can be inadvertently left on, wasting fuel, potentially draining the battery voltage and requiring an operator to eventually turn off the heater.

A further problem associated with prior art auxiliary heaters is incompatibility with remote starting systems.

In the absence of a suitable supplemental heater, manufacturers often have employed a separate electrical heater for operation when the vehicle is running. This undesirable because it is yet another piece of equipment to install and service.

Accordingly, it is an object of the invention to provide an improved vehicle heater which can combine the functions of an engine preheater and an auxiliary space heater for the vehicle.

It is also an object of the invention to provide an improved heater for vehicles which can supplement the heat provided by the conventional vehicle heater, but does not require continuous operation of the heater's own coolant circulation pump.

It is a further object of the invention to provide an improved vehicle heater which is relatively light in weight compared with prior art vehicle heaters, particularly the total weight of a conventional engine preheater and a conventional auxiliary space heater.

It is a still further object of the invention to provide an improved vehicle heater which is simple and rugged in construction.

SUMMARY OF THE INVENTION

In accordance with these objects, there is provided an auxiliary vehicle heater for a vehicle having an interior, an engine and a vehicle interior heater heated by engine coolant. The auxiliary heater includes a burner, a heat exchanger and a coolant pump connected to the heat exchanger. Controls are operatively connected to the burner and the coolant pump to operate the auxiliary heater in a first mode when the engine is stopped to preheat the engine or keep the engine warm. Controls are operatively connected to the burner and the coolant pump to operate the auxiliary heater in a second mode when the engine is running to improve heating of the vehicle interior.

There is provided, according to another aspect of the invention, an auxiliary vehicle heater for a vehicle having an interior, an engine and a vehicle interior heater heated by engine coolant. The auxiliary heater includes a burner, a heat exchanger and a coolant pump connected to the heat exchanger. There are controls operatively connected to the burner and the coolant pump to operate the auxiliary heater when the engine is running to improve heating of the vehicle interior. The controls include automatic controls which monitor engine coolant temperature. The controls cause the burner and the pump to function when the engine is running and the coolant temperature is below a pre-set second temperature. The controls stop the burner and the pump functions when the engine is not running or when the coolant temperature is above the pre-set second temperature.

Preferably the controls operate the pump for a pre-set period of time before operating the burner.

There is provided, according to another aspect of the invention, a method of operating an auxiliary heater for a vehicle with an engine, an interior, and a vehicle interior heater heated by engine coolant. The method includes the steps of turning on the pump and the burner when the engine coolant temperature is below a second pre-set temperature and when the engine is running. The controls stop the burner and the pump when the engine is not running or when the coolant temperature is above the pre-set second temperature.

Preferably the controls start the pump function at a set period of time before starting the burner.

Auxiliary heaters and auxiliary heating methods according to the invention offers significant advantages over the prior art. In one mode of operation the coolant pump stops when the auxiliary heater has raised the coolant temperature to a pre-set temperature while the engine is running. The vehicle engine's coolant pump then takes on the task of circulating the coolant through the heater. The auxiliary heater assumes a standby mode or sub-state. However the coolant flow through the heater, as applied only by the engine pump, may be small compared to the flow using the pump in the auxiliary heater. The auxiliary heater may therefore cool down quickly compared to the rest of the coolant system. This may give a false indication to the temperature sensor which would cause the heater to start up and bum fuel unnecessarily. It would then cycle off almost immediately. To prevent this problem, the auxiliary heater according to the invention preferably cycles the pump on for a period of time, say three minutes, before the burner. This ensures that the coolant temperature at the heater is the same as in the rest of the system to avoid a false reading which turn on the burner unnecessarily. If the temperature is in fact above the preset level, then the pump turns off without igniting the burner.

In addition, the system clock of the internal controller is preferably stopped while the heater is in the supplemental-standby mode or sub-state so as not to accumulate misleading run times since no components are actually running.

The invention also can overcome the problem of providing two separate heaters for preheating the engine and for supplementary interior heating of the vehicle. This is done by sensing when the vehicle's engine is running and automatically transferring the heater from the preheat function to the supplemental function when this occurs. The supplemental function can be entirely automatic and transparent to the vehicle operator.

Wastage of fuel is significantly reduced by utilizing a timer to turn off the preheat function after a preset period of time, say 90 minutes.

The invention also overcomes problems associated with utilizing remote starting systems by allowing a direct interface with the radio receiver unit on vehicles.

The need for a separate, electrical supplementary heater is removed by providing a single heater which can perform both preheating and supplemental heating operations with a single piece of equipment.

DESCRIPTION OF THE PREFERRED EMBODIMENTS

Figure 16:
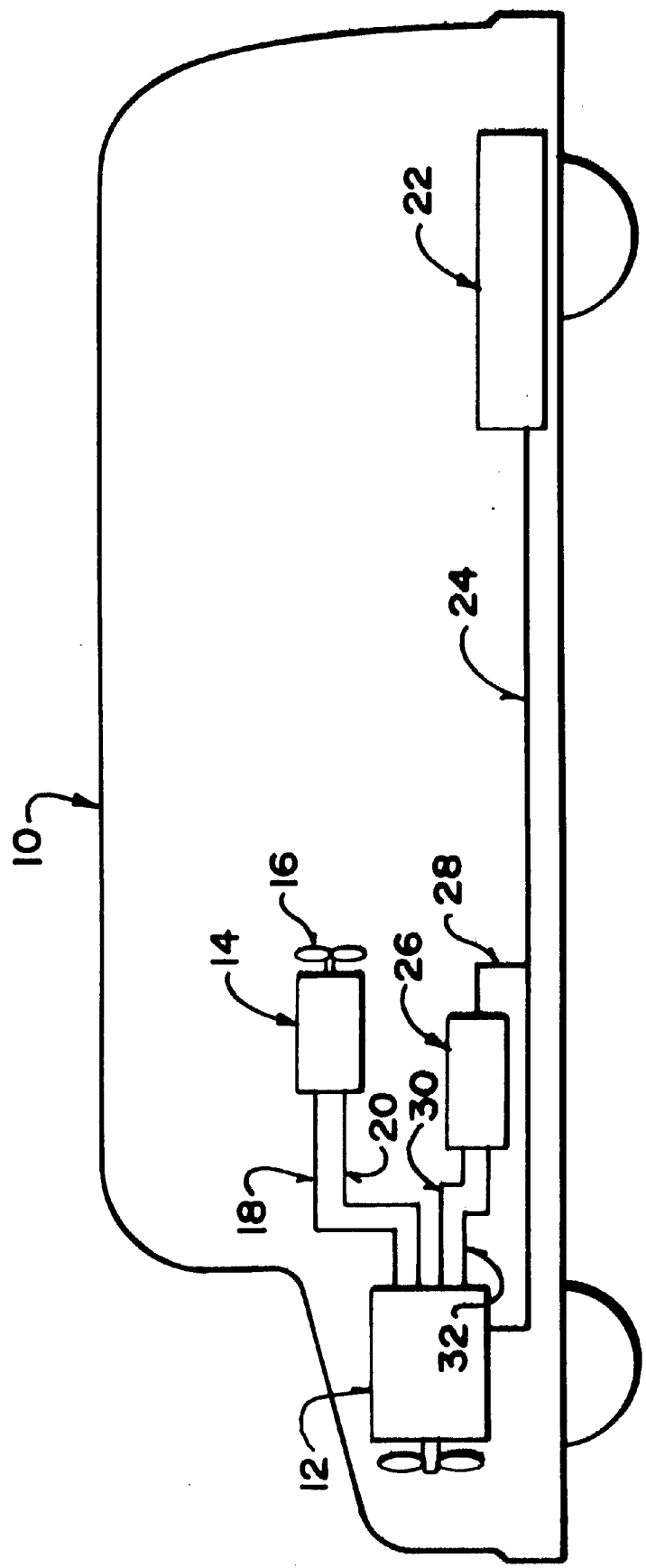
FIG. 16 is a diagrammatic side elevation of a transit vehicle showing the installation of the heater of FIG. 1.

Referring first to FIG. 16, a transit vehicle 10 is shown in the form of a bus. The bus is provided with a conventional diesel engine 12 and a conventional vehicle heat exchanger 14 with fan 16 coupled to the engine by coolant conduits 18 and 20. The heat exchanger is used for interior heating of the vehicle as is well known and is commonly known as a "heater". The vehicle has a fuel tank 22 which in this example is connected to engine 12 by a fuel line 24 for supplying diesel fuel to the engine.

There is also an auxiliary heater 26 which is connected to the fuel line 24 by a second fuel line 28. The auxiliary heater 26 is also connected to the engine cooling system by coolant conduits 30 and 32.

Figure 1:
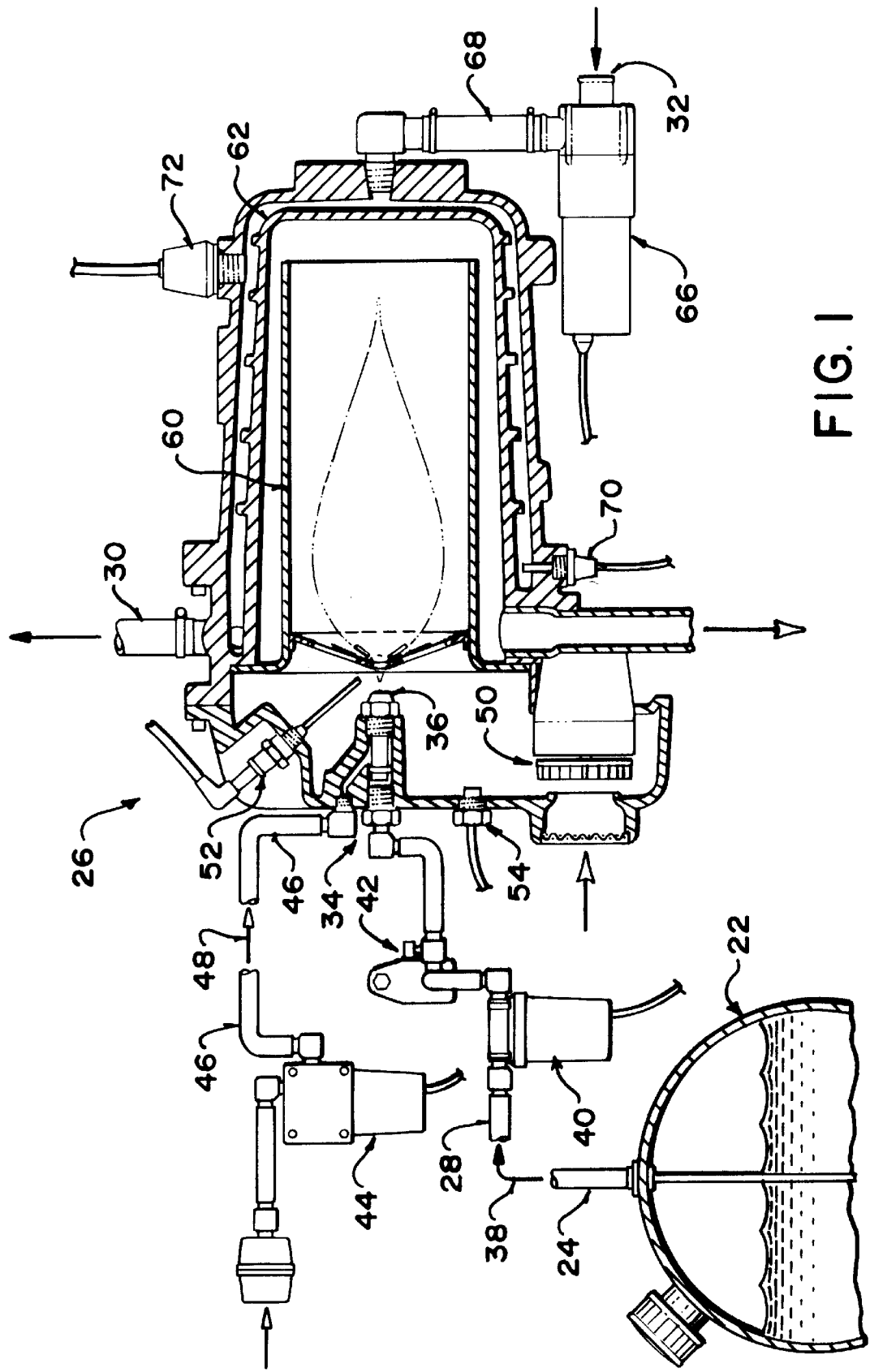
FIG. 1 is a side elevation, partly schematic, of an auxiliary heater for a vehicle according to an embodiment of the invention and the fuel tank of the vehicle.

Referring to FIG. 1, this shows the heater 26 in more detail. The heater is generally conventional apart from the control system. The heater includes a burner unit 34 including a nozzle 36. Fuel is supplied to the heater from fuel tank 22 by means of conduits 24 and 28 as indicated by arrow 38. The fuel is pumped from the fuel tank by a fuel pump 40 and regulated by a fuel regulator 42.

The heater also includes an air compressor 44 which supplies compressed air to the nozzle through conduit 46 as illustrated by arrow 48. The nozzle utilizes the compressed air to atomize the fuel received from the fuel pump and fuel regulator. The heater has an air blower 50 which provides combustion air for the burner. The burner unit also includes a spark electrode 52. A flame sensor 54 is mounted on the burner unit adjacent the nozzle.

There is a combustion tube 60 on the heater surrounded by a heat exchanger 62. Conduit 32 serves a coolant inlet and is connected to a coolant pump 66. The coolant pump is connected to the heat exchanger via a conduit 68. Conduit 30 is connected to the heat exchanger and serves as a coolant outlet for coolant heated by the heater. There is also a temperature sensor 70 mounted on the heat exchanger and an overheat sensor 72. These components are generally conventional and therefore are not described in more detail.

Figure 2:
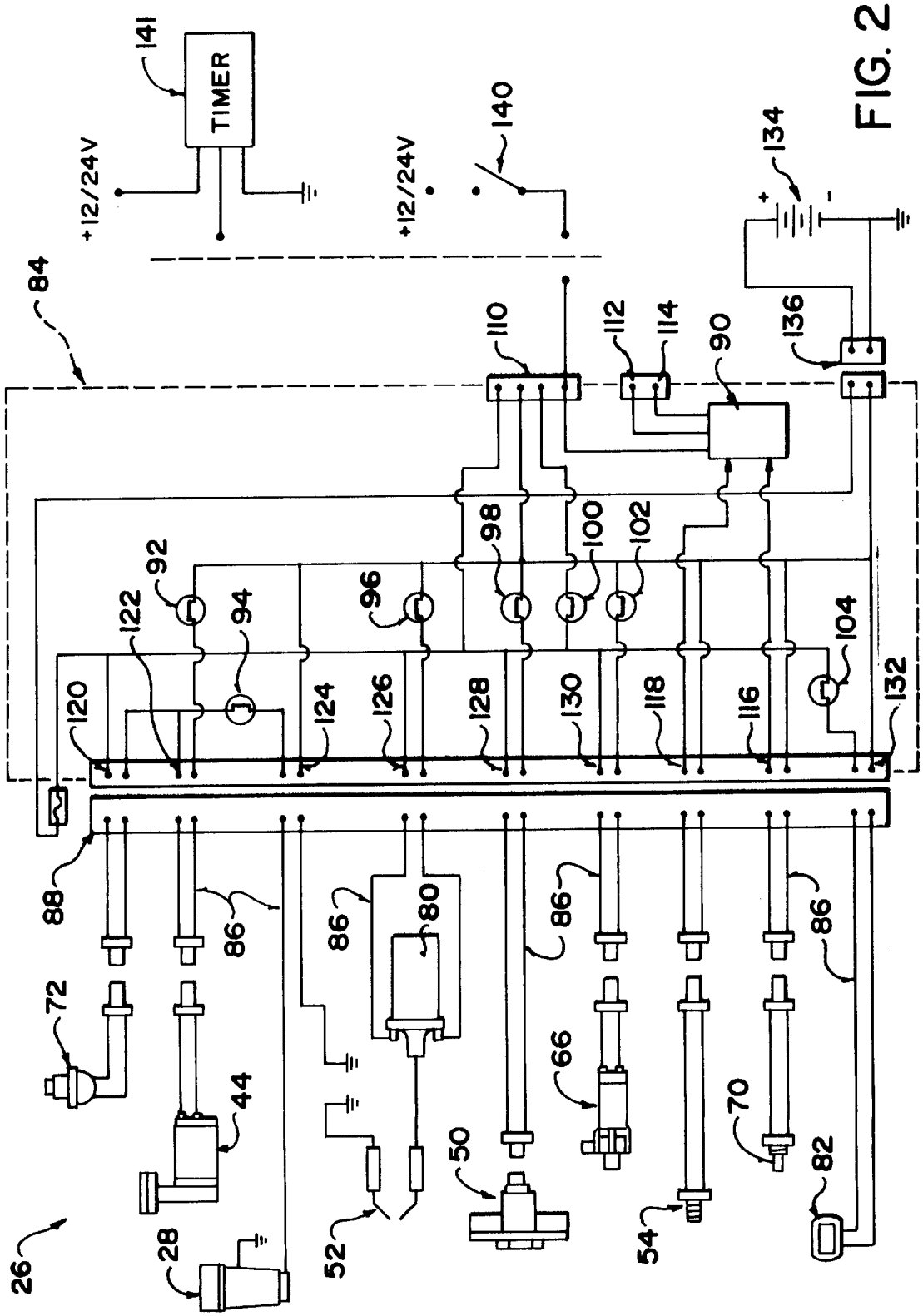
FIG. 2 is a wiring diagram of the auxiliary heater operating in the standard heat mode.

FIGS. 2–7 are wiring diagrams of the control system for the heater 26 showing the controls for different modes of operation. Referring first to FIG. 2, this the wiring diagram for the standard heat mode. This is the conventional mode of operation of the heater similar to the prior art. During this mode the heater operates in thermostatically controlled burn cycles in order to keep the vehicle coolant heated. It continues to run on demand during this mode. Each time the coolant level drops below a preset level, the burner is turned on until the coolant reaches a higher preset temperature. When it reaches this higher temperature the burner is turned off, but the pump continues to run.

The components of the heater are shown on the left side of the FIG. 2 including overheat sensor 72, compressor 44, fuel pump 28, air blower 50, coolant pump 66, flame sensor 54 and temperature sensor 70 also shown in FIG. 1. In addition there are further components including ignition coil 80 and hour meter 82. All of these components are connected to an auxiliary heater controller, shown generally at 84, by a plurality of conductors 86 and a pin connector 88.

The controller 84 includes a microcontroller 90 which, in this particular embodiment, is an NEC D78CP14G microcontroller. The microcontroller is programmed with software described in the flow-chart of FIGS. 15a–15j. Attached hereto, and labelled Appendix A is the source code of the software.

Controller 84 is shown in simplified form in FIGS. 2–7. A plurality of circuit elements are represented schematically by a series of field-effect transistors (FET's) 92, 94, 96, 98, 100, 102 and 104.

Referring back to FIG. 2, the controller has six inputs including main switch input 110, auxiliary input 112, auto switch input 114, temperature sensor input 116, flame sensor input 118 and overheat sensor input 120. There are six output terminals including compressor output 122, fuel pump output 124, spark electrode output 126, blower output 128, coolant pump output 130 and hour meter output 132.

Power for the controller is supplied from vehicle battery 134 via connector 136.

Standard Run State

As mentioned above, the Standard Run State is equivalent to the prior art operation of auxiliary vehicle heaters. The heater operates in thermostatically controlled burn cycles to keep the vehicle coolant heated. This state is primarily entered from the off state by placing a constant signal voltage on the main terminal 10 via a toggle switch 140 which is manually operated by the vehicle operator or maintenance personnel or alternatively by a timer. The off state is resumed when the signal voltage is removed by opening toggle switch 140 manually.

As described further below, the Standard Run State overrides and cancels the Preheat Run State. The Standard Run State is entered from the Preheat Run State when a constant signal voltage is placed on the main input 110.

The Standard Run State also overrides the Supplemental Run State described below. The Standard Run State is entered from the Standard (Supplemental) Run State when the signal voltage is removed from the auto input terminal 112. The standard run state is exited to the Standard (Supplemental) Run State when a constant signal voltage is placed on the auto input 114.

Figure 8:
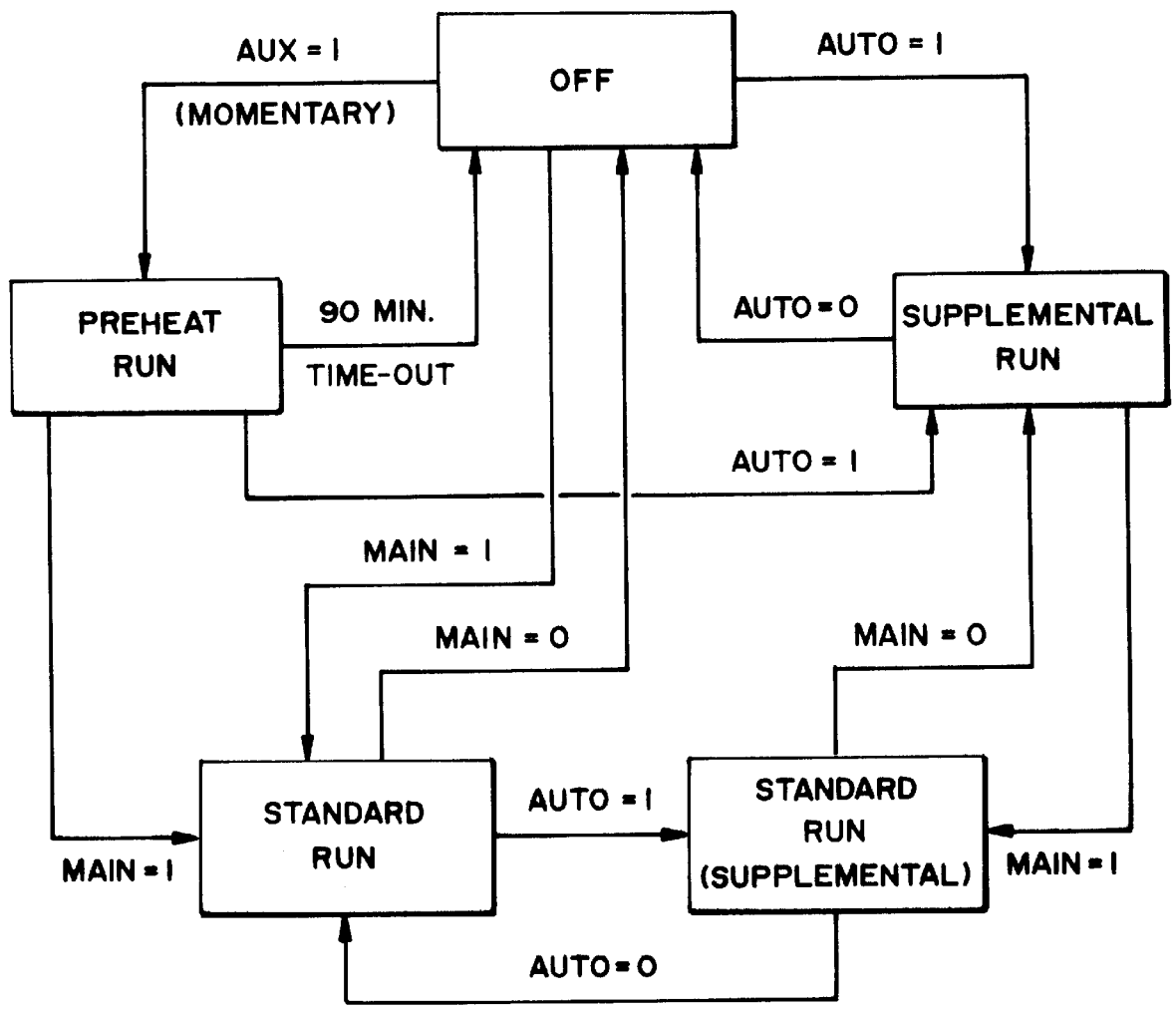
FIG. 8 is an overall operational state diagram showing the different modes of operation of the heater of FIG. 1.
Figure 9:
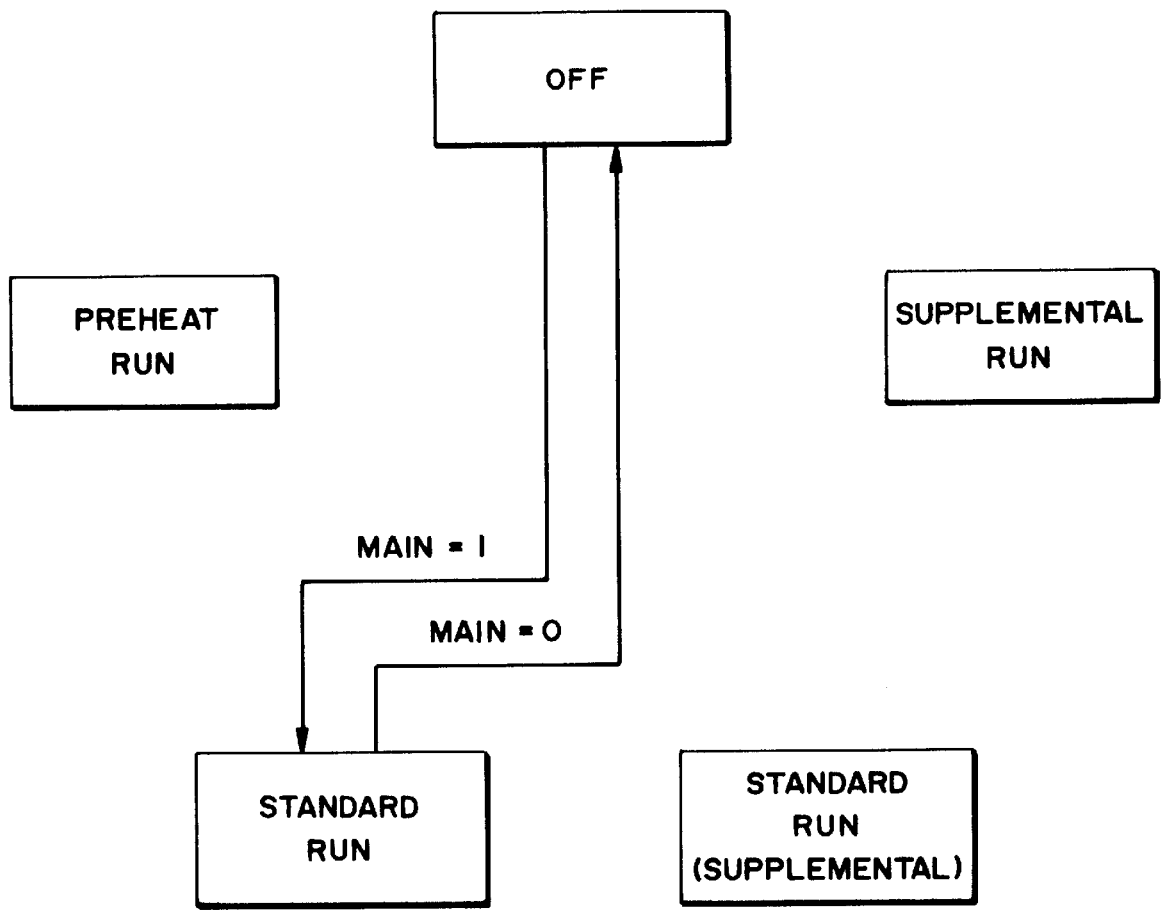
FIG. 9 is an operational state diagram showing the standard heat mode only.

The overall operation of the heater is described diagrammatically in FIG. 8. The standard heat mode only is shown in FIG. 9.

Preheat Run State

Figure 3:
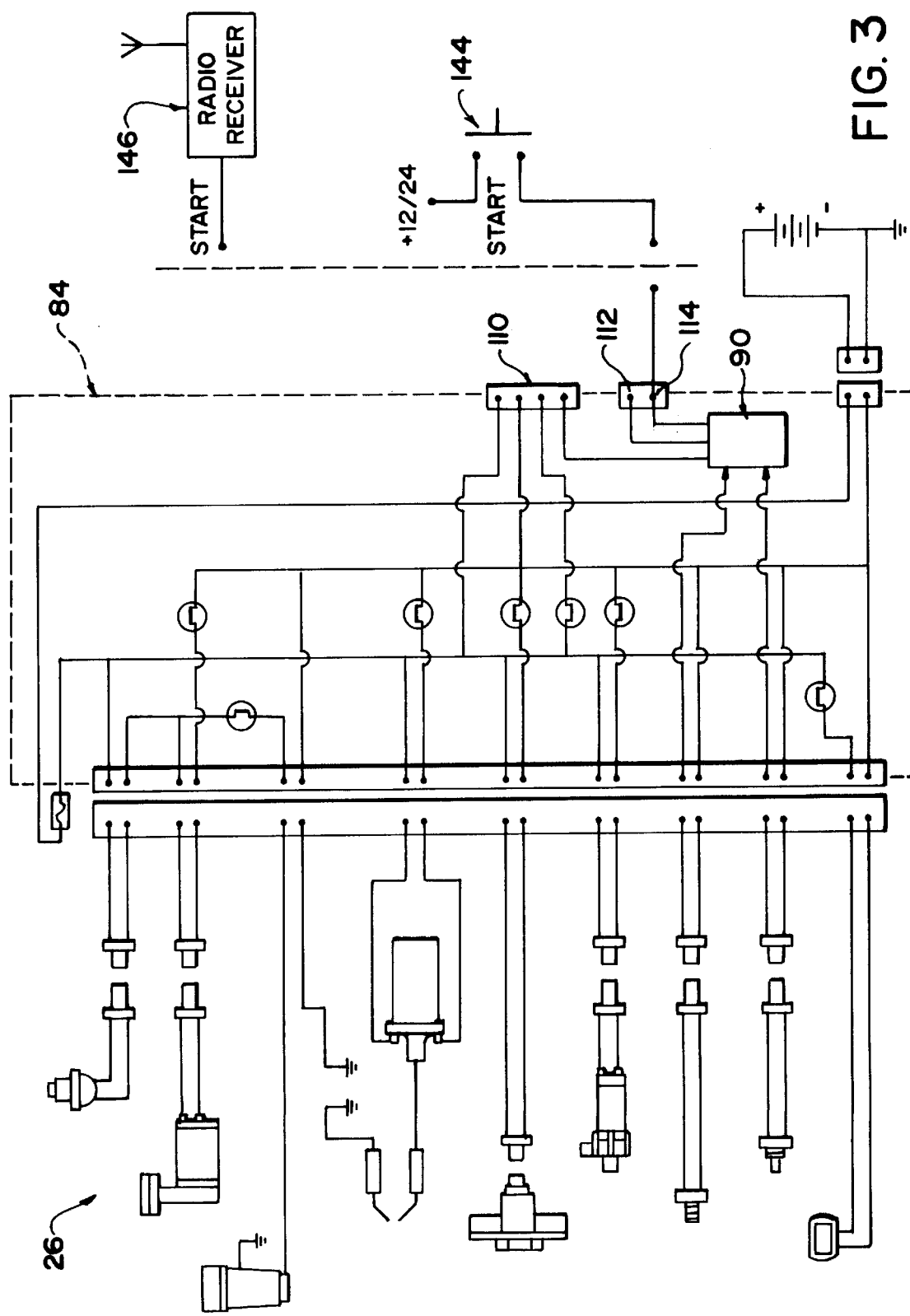
FIG. 3 is a diagram similar to FIG. 2 with the heater operating in the preheat mode.
Figure 10:
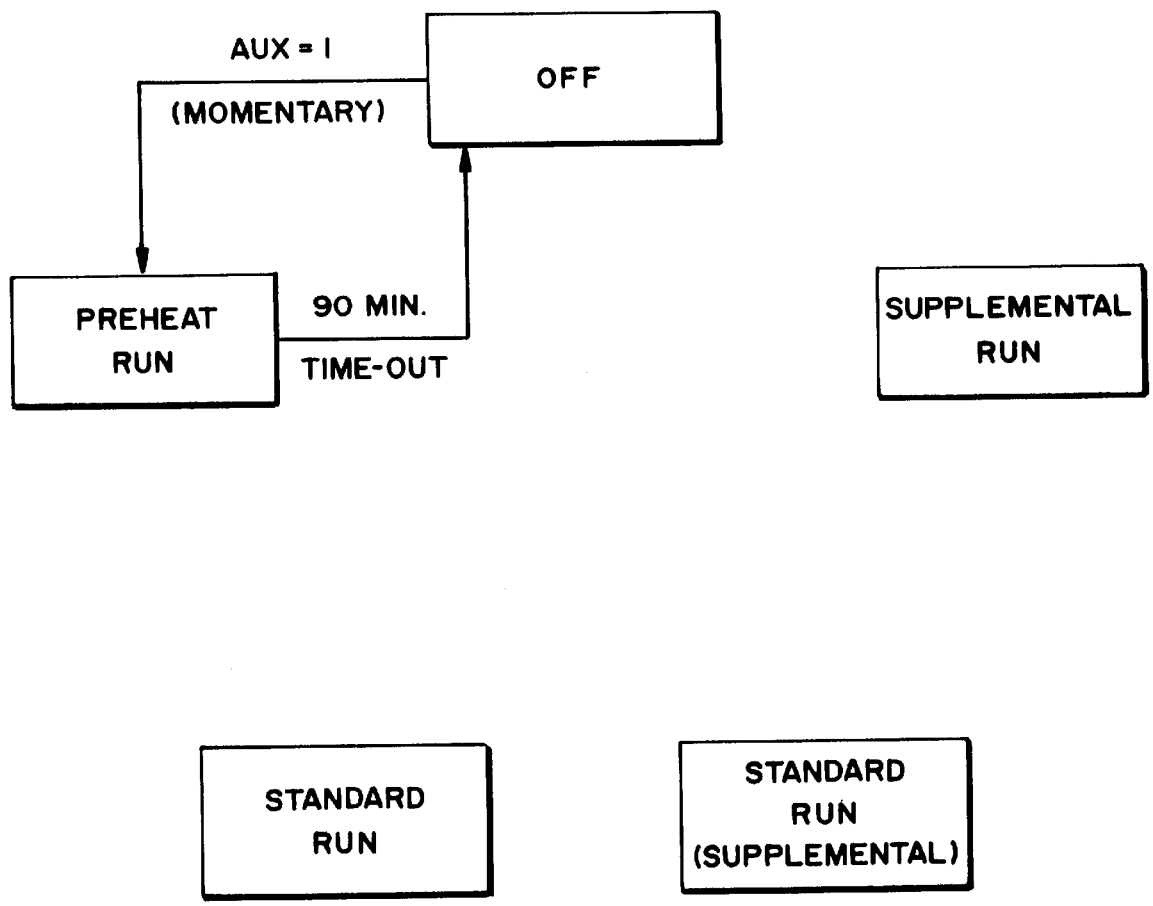
FIG. 10 is an operational state diagram showing the preheat mode only.

FIGS. 3–7 are generally the same as FIG. 2, but show the wiring diagram and controller during modes of operation different from the standard heat mode illustrated in FIG. 2. The Preheat Mode is shown in FIG. 3 and represented diagrammatically in FIG. 10. When the heater is operated in the Preheat Run State, the heater heats the coolant in the same manner as in the Standard Run State. However the Preheat Run State differs in that it includes a timer which turns the heater off when the time expires. In this particular example the timer has a 90 minute duration although this can be changed according to requirements. The timer prevents the heater from running indefinitely. The timer is internal to the controller 84, in particular the microcontroller 90 with associated software.

The Preheat Run State is entered from the off state when a momentary signal voltage is placed on the auxiliary input terminal 114 by means of a push button 144. Alternatively the momentary voltage can be applied by means of a radio transmitter transmitting a signal to remote radio receiver 146.

The Preheat Run State is exited to the off state when the 90 minute timer expires. The Preheat Run State may be overridden and cancelled by either the Supplemental or the Standard Run State. The Preheat Run State is exited to the Standard Run State when a constant voltage is placed to the main input 110. It is exited to the Supplemental Run State when a constant signal voltage is placed on the auto input 112.

As described above, the purpose of the Preheat Run State is to preheat the engine by heating the coolant a period of time before the vehicle is started. This is typically useful for vehicles stored outdoors in cold climates.

Supplemental Run State

Figure 4:
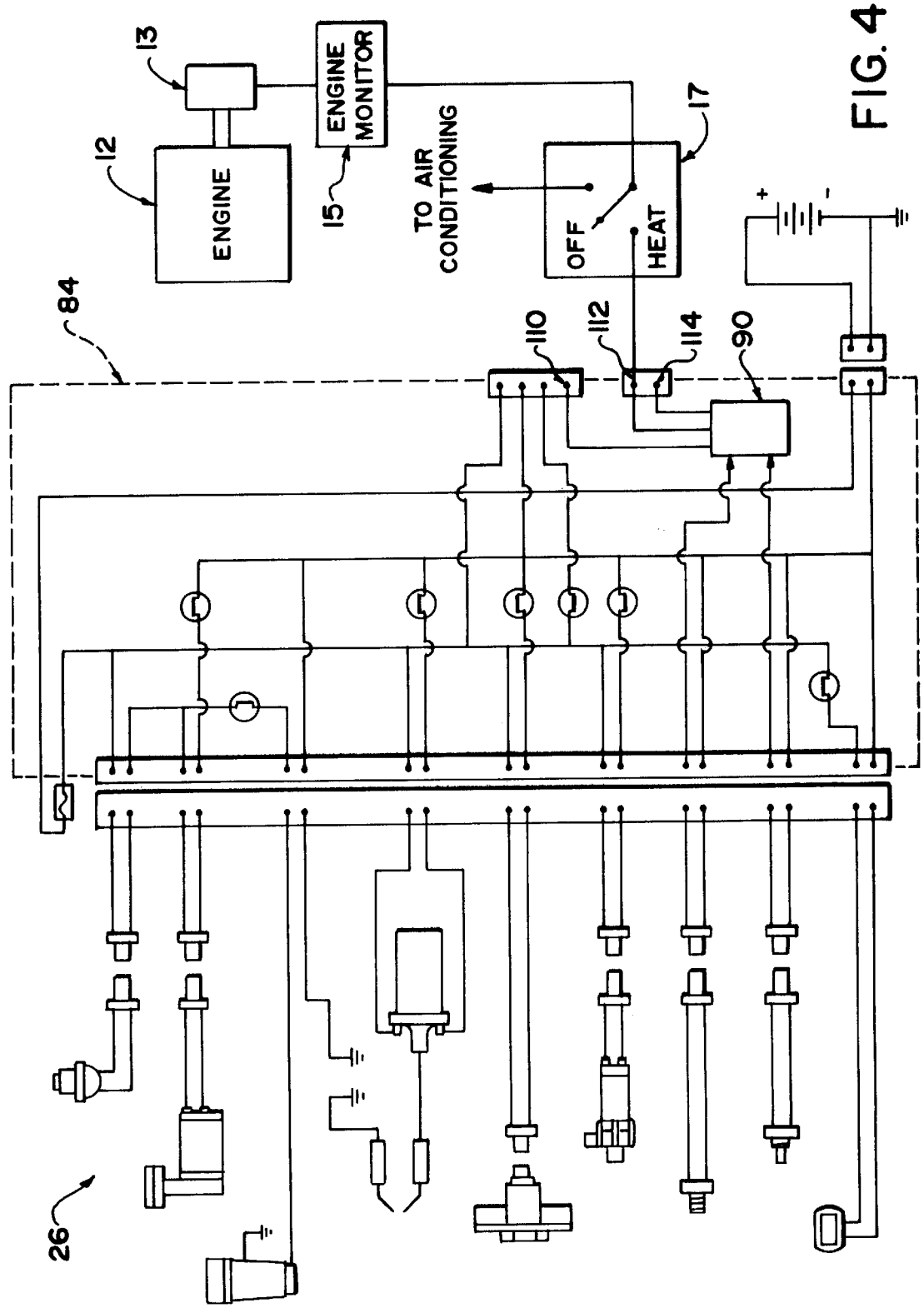
FIG. 4 is a diagram similar to FIG. 2 with the heater operating in the supplemental heat mode.
Figure 11:
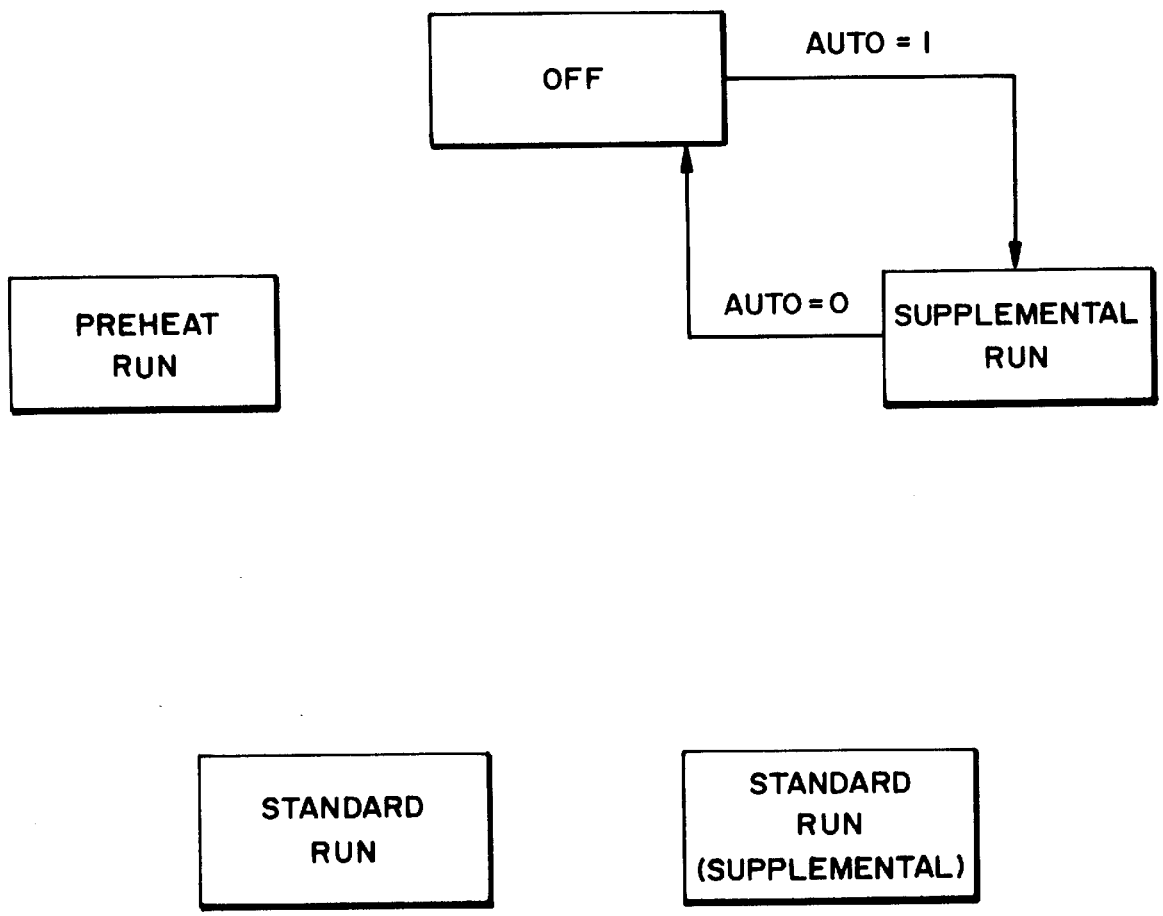
FIG. 11 is an operational state diagram showing the supplemental heat mode only.

Referring to FIGS. 4 and 11, the Supplemental Run State is entered from the off state when a constant signal voltage is placed on auto input 112. The preferred way of accomplishing this is illustrated in FIG. 4 where auto input 112 is connected to heating ventilation and air conditioning (HVAC) controls 17 of the vehicle. A constant voltage can be supplied to the auto terminal 112 only when the controls are in the heat position as illustrated. The HVAC controls are connected to the engine monitor 15 which in turn is connected to the alternator 13 of the engine 12. Thus a constant voltage is only supplied to input 112 when the engine is running. In short, the Supplemental Run State is automatically entered when the engine is running and the HVAC controls are turned to the heat position. The Supplemental Run State is entered from the Preheat Run State discussed below, when a constant signal voltage is placed on the auto input 112 which occurs when the engine starts. The Supplemental Run State is entered from the Standard (Supplemental) Run State, described below, when a constant signal voltage is removed from the main input 110.

The Supplemental Run State is exited to the off state when the signal voltage on the auto input is removed. This occurs when the HVAC controls are turned to the off or air conditioning positions. The Supplemental Run State is also exited to the Standard (Supplemental) Run State when a constant signal voltage is placed on the main input terminal 110.

The Supplemental Run State overrides and cancels the Preheat Run State.

Standard (Supplemental) Run State

The Standard (Supplemental) Run State is a transition mode utilized for automatic operation. The Standard (Supplemental) Run State is entered from the Supplemental Run State when a constant signal voltage is placed on the main input 110. It is entered from the Standard Run State when a constant signal voltage is placed on the auto input 112. This state is exited to the Supplemental Run State when the signal voltage on the main input is removed and is exited to the Standard Run State when the signal voltage on the auto input is removed.

This state serves as a transition between the Standard and Supplemental Run states. Heater function in the state is identical to the Standard Run State. Effectively this transition allows the Standard Run State to override the Supplemental Run State, but not to cancel the Supplemental Run State.

Off State

Off State is entered from the Preheat Run State when the timer described above expires. It is entered from the Standard Run State when the signal voltage on the main input 110 is removed. The Off State is entered from the Supplemental Run State when the signal voltage on the auto input is removed. The Off State is exited to the Preheat Run State when a momentary signal voltage is placed on the auxiliary input 114. The Off State is exited to the Standard Run State when a constant signal voltage is placed on the main input 110. The Off State is exited to the Supplemental Run State when a constant signal voltage is placed on the auto input 112.

Figure 5:
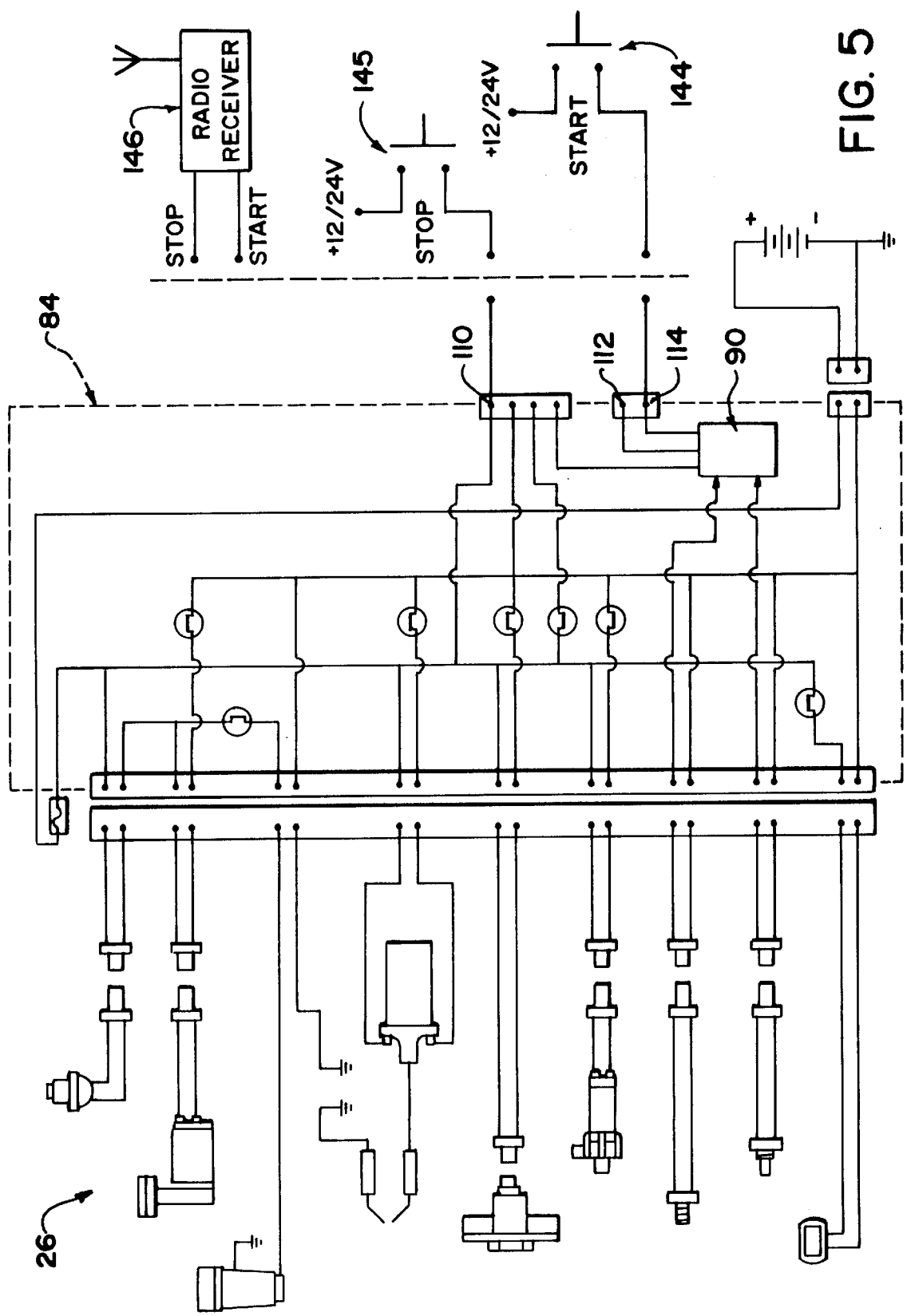
FIG. 5 is a diagram similar to FIG. 2 with the heater operating in the preheat mode with stop.
Figure 12:
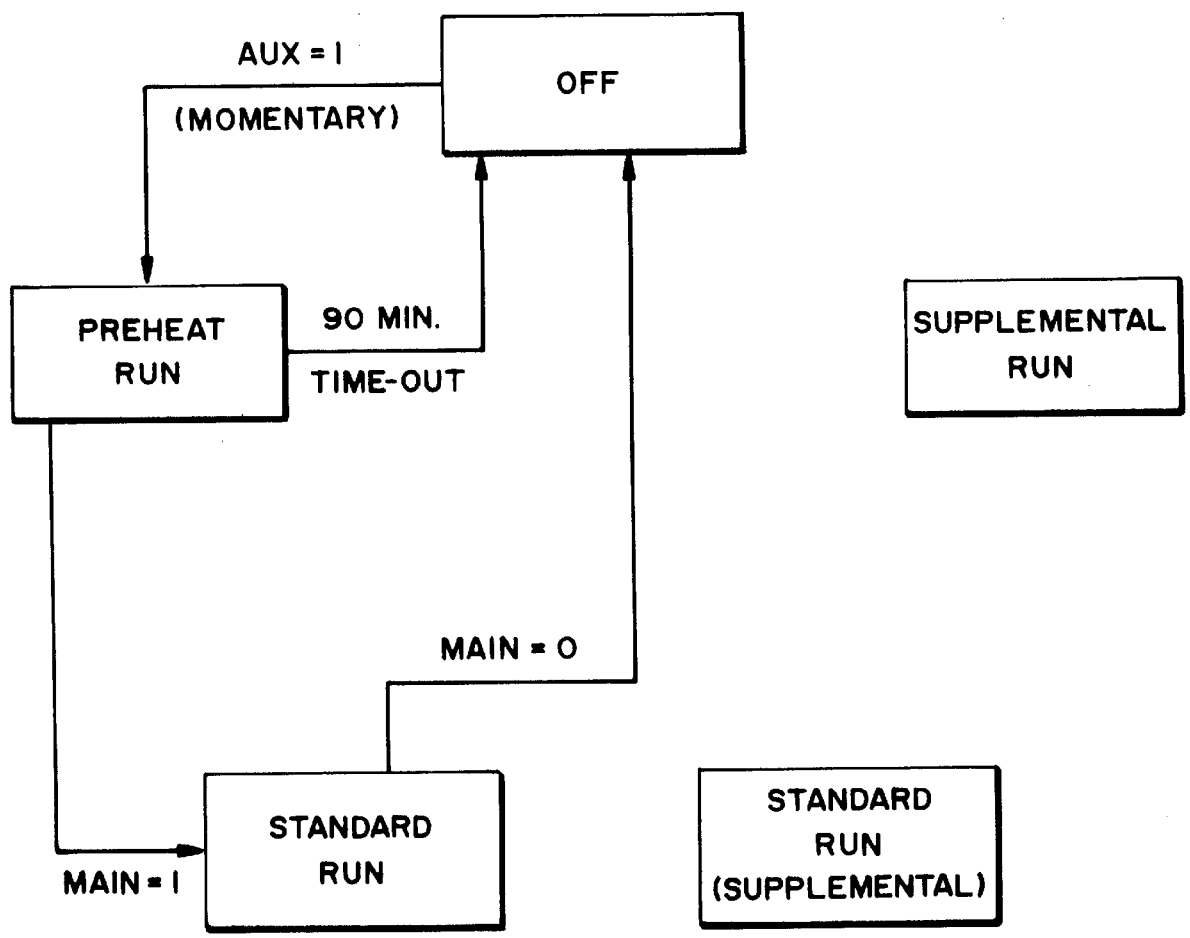
FIG. 12 is a state diagram showing the preheat mode with stop.

FIG. 5 illustrates the Preheat State with Stop. This is similar to the Preheat Run State shown in FIG. 2, but includes a stop button 145 connected to the main input 110. The Preheat automatically stops after the 90 minute timer or it can be manually stopped by means of push button 145. This is also illustrated diagrammatically in FIG. 12.

Figure 6:
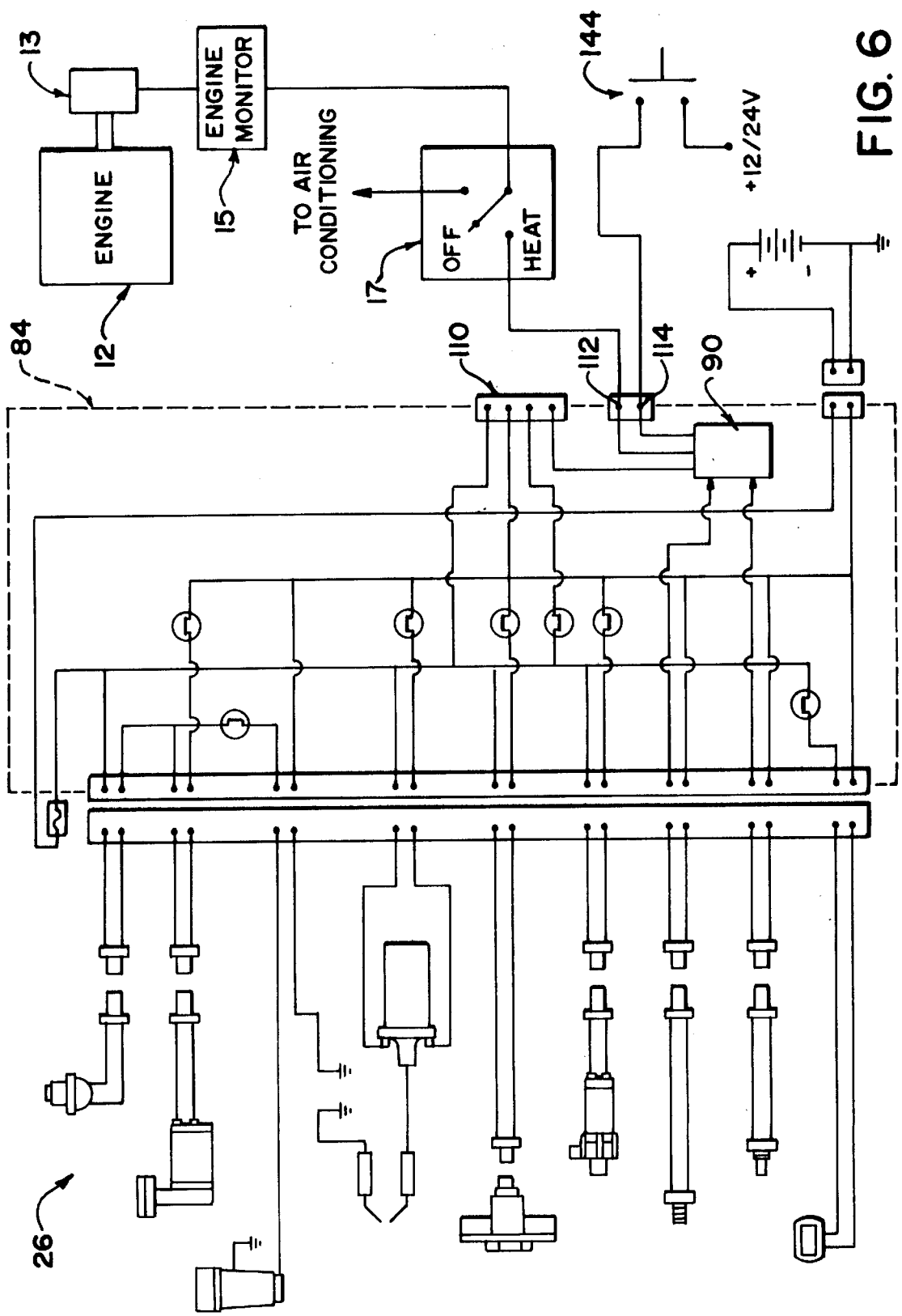
FIG. 6 is a diagram similar to FIG. 2 with the heater operating in the preheat/supplemental heat modes and with semi-automatic operation.
Figure 13:
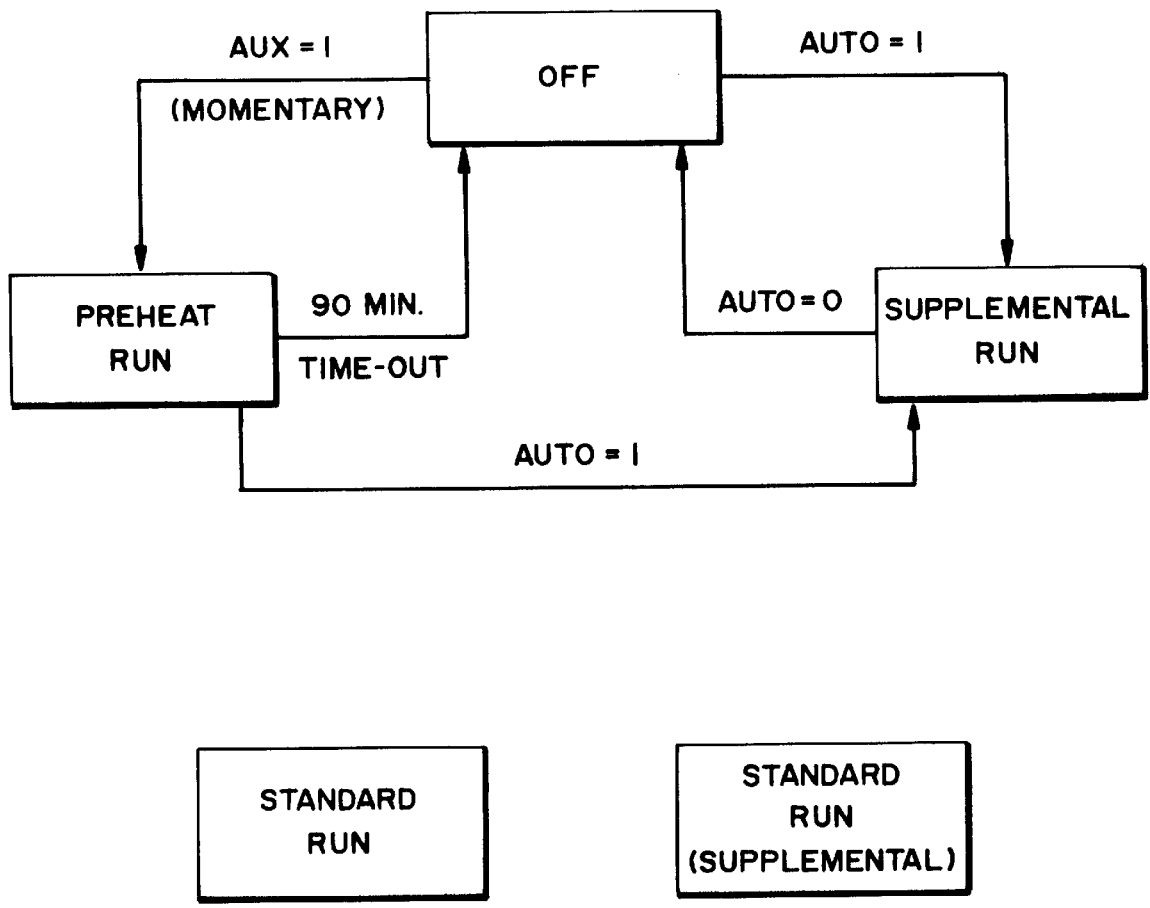
FIG. 13 is a state diagram showing the preheat/supplemental heat modes with semi-automatic operation.

Referring to FIGS. 6 and 13, these show controls for a combination of the Preheat and Supplemental Run States with semi-automatic operation.

The Preheat State is entered manually by means of push button 144. When the vehicle is started within the 90 minute Preheat time period, the heater automatically transfers to the Supplemental Run State. If the vehicle is not started within the 90 minute period, then the heater shuts off and assumes the Off State. It may subsequently enter the Supplemental Run State when the vehicle engine is started. When the engine is turned off, the heater also turns off.

Figure 7:
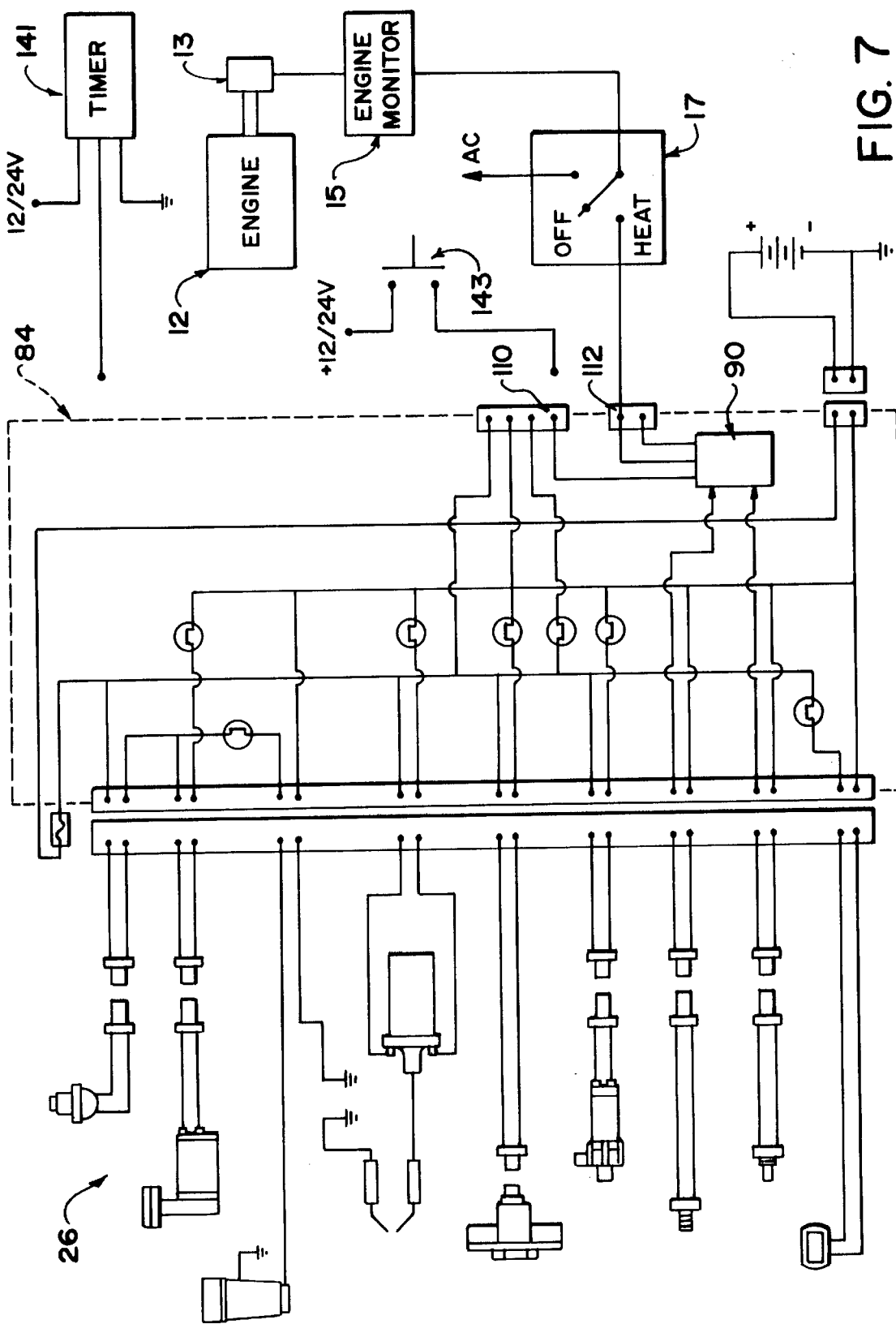
FIG. 7 is a diagram similar to FIG. 6 with the heater operating fully automatically.
Figure 14:
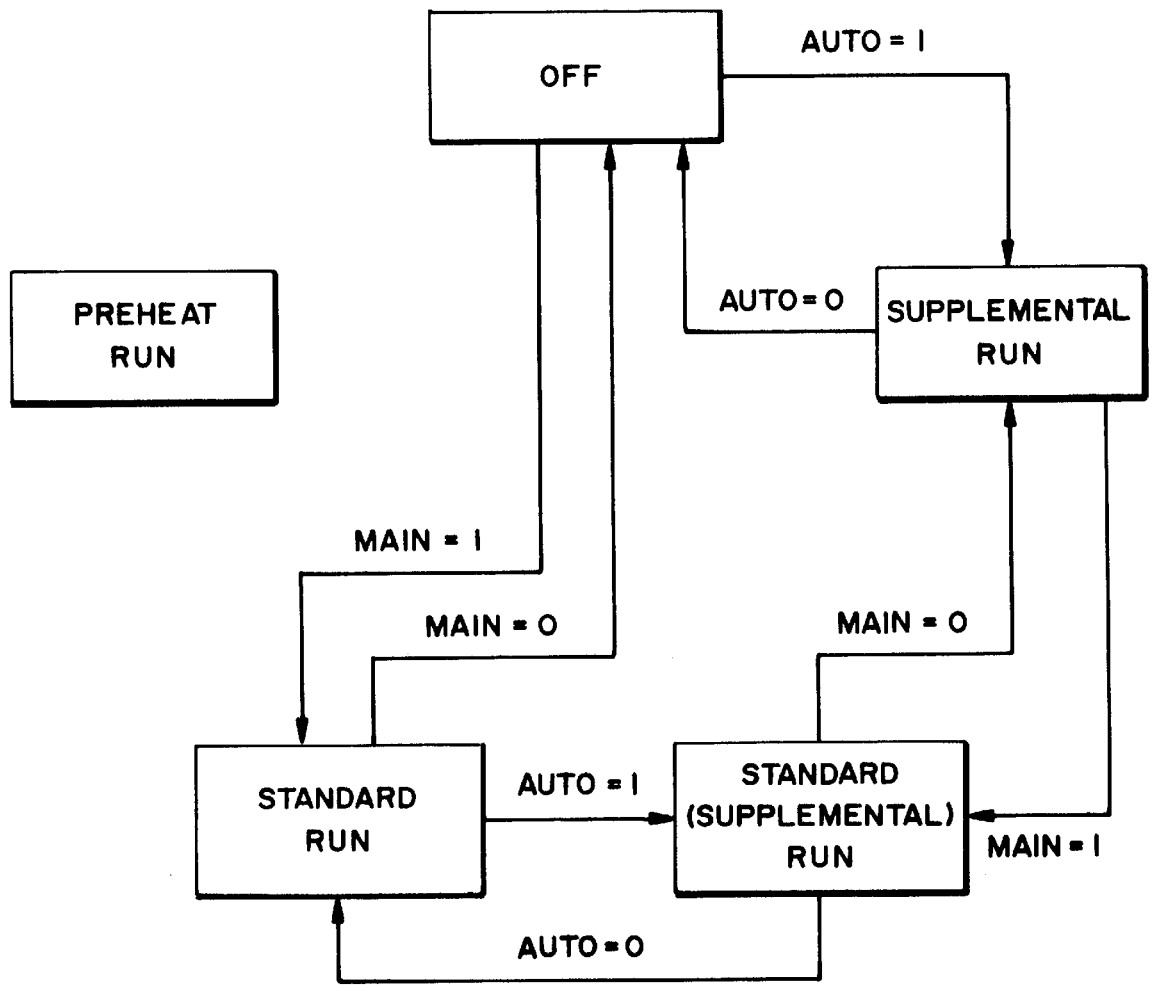
FIG. 14 is a state diagram showing the standard/supplemental heat modes and fully-automatic operation.
Figure 15A:
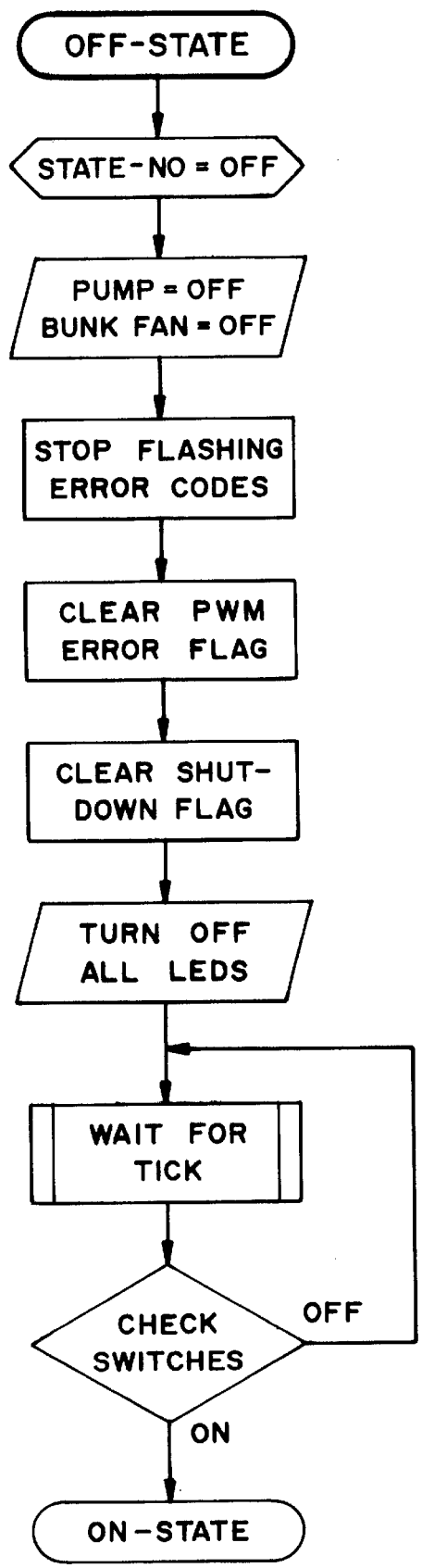
FIGS. 15a–15j are consecutive segments of a flowchart of the software for the heater of FIG. 1.
Figure 15B:
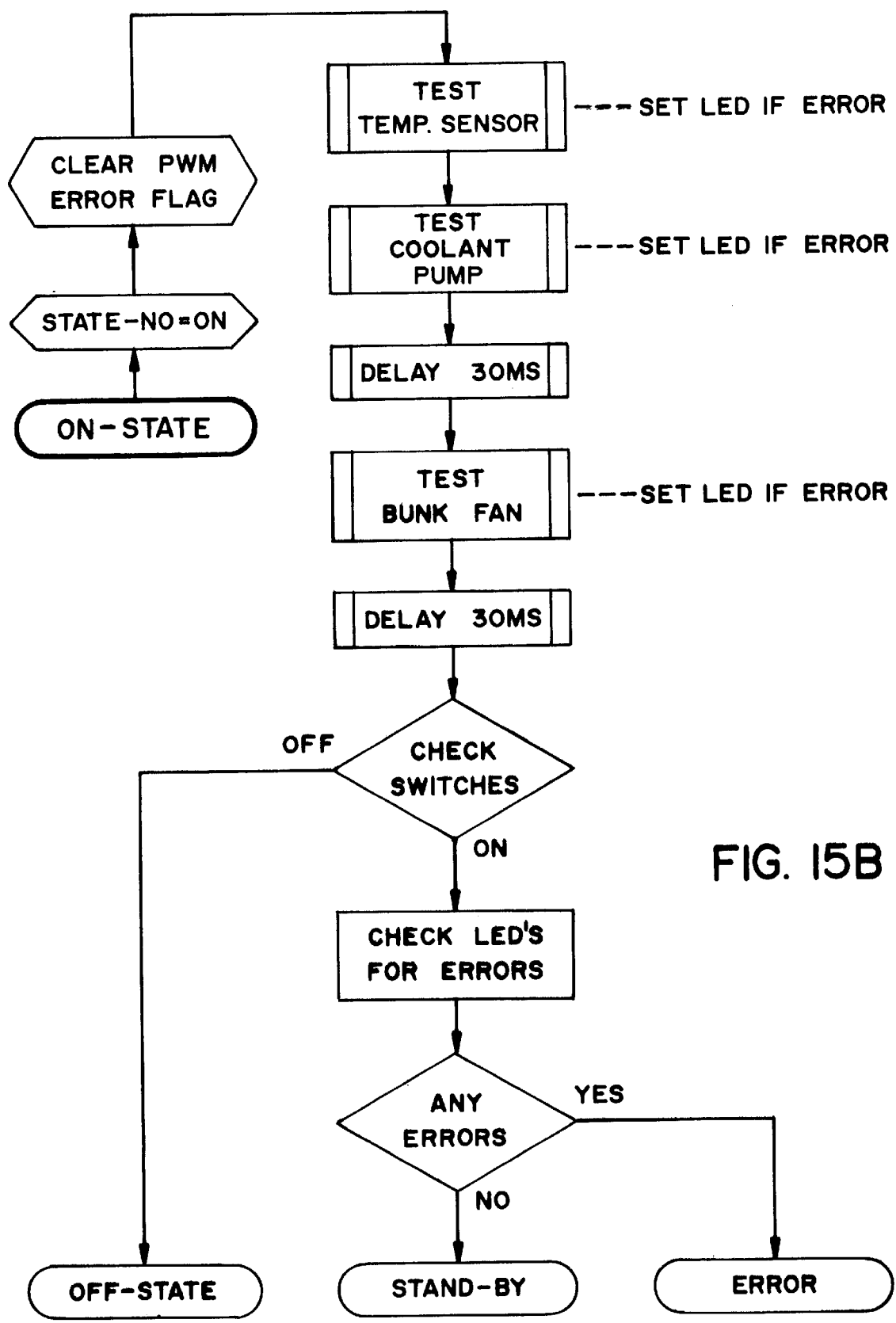
Figure 15C:
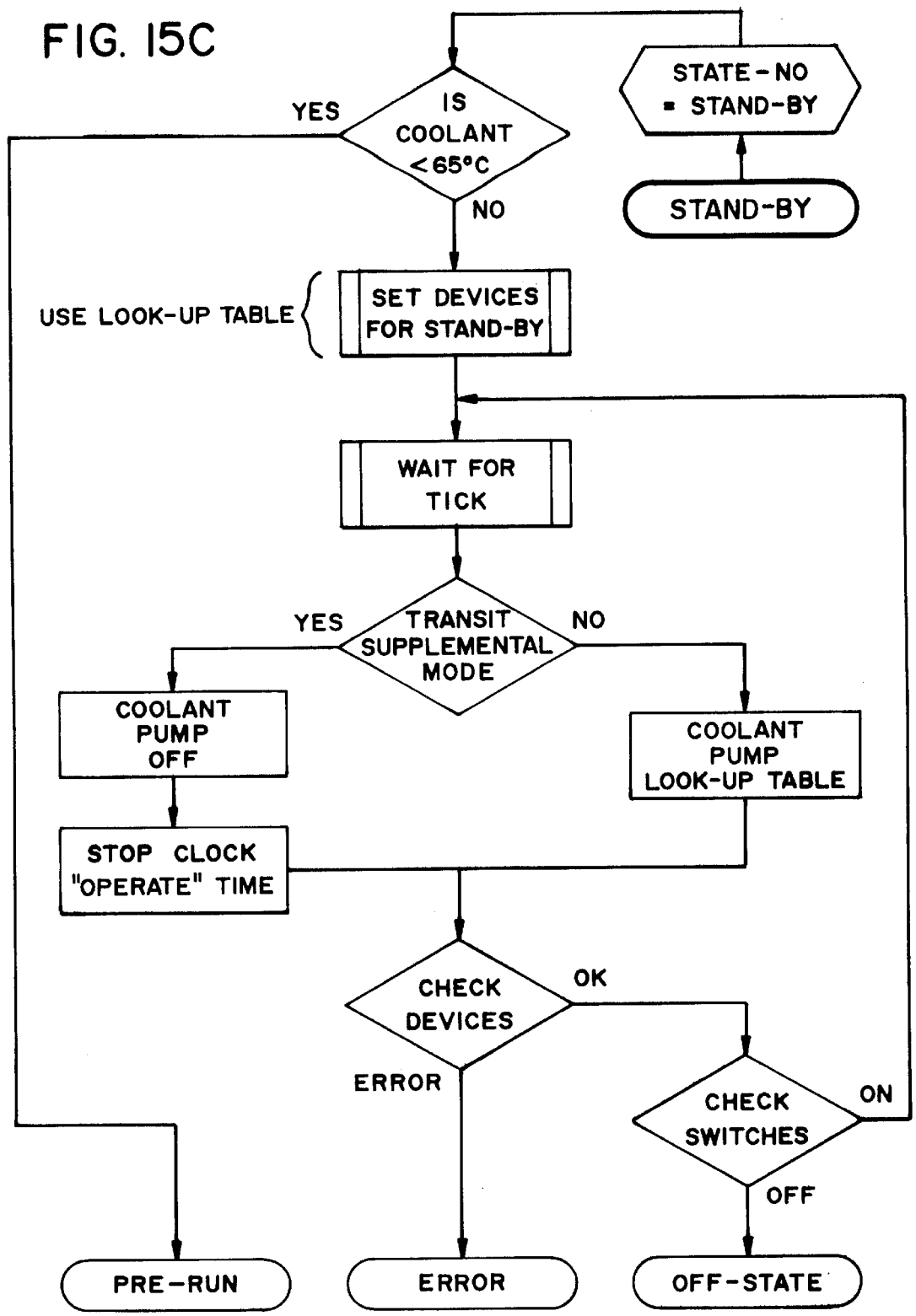
Figure 15D:
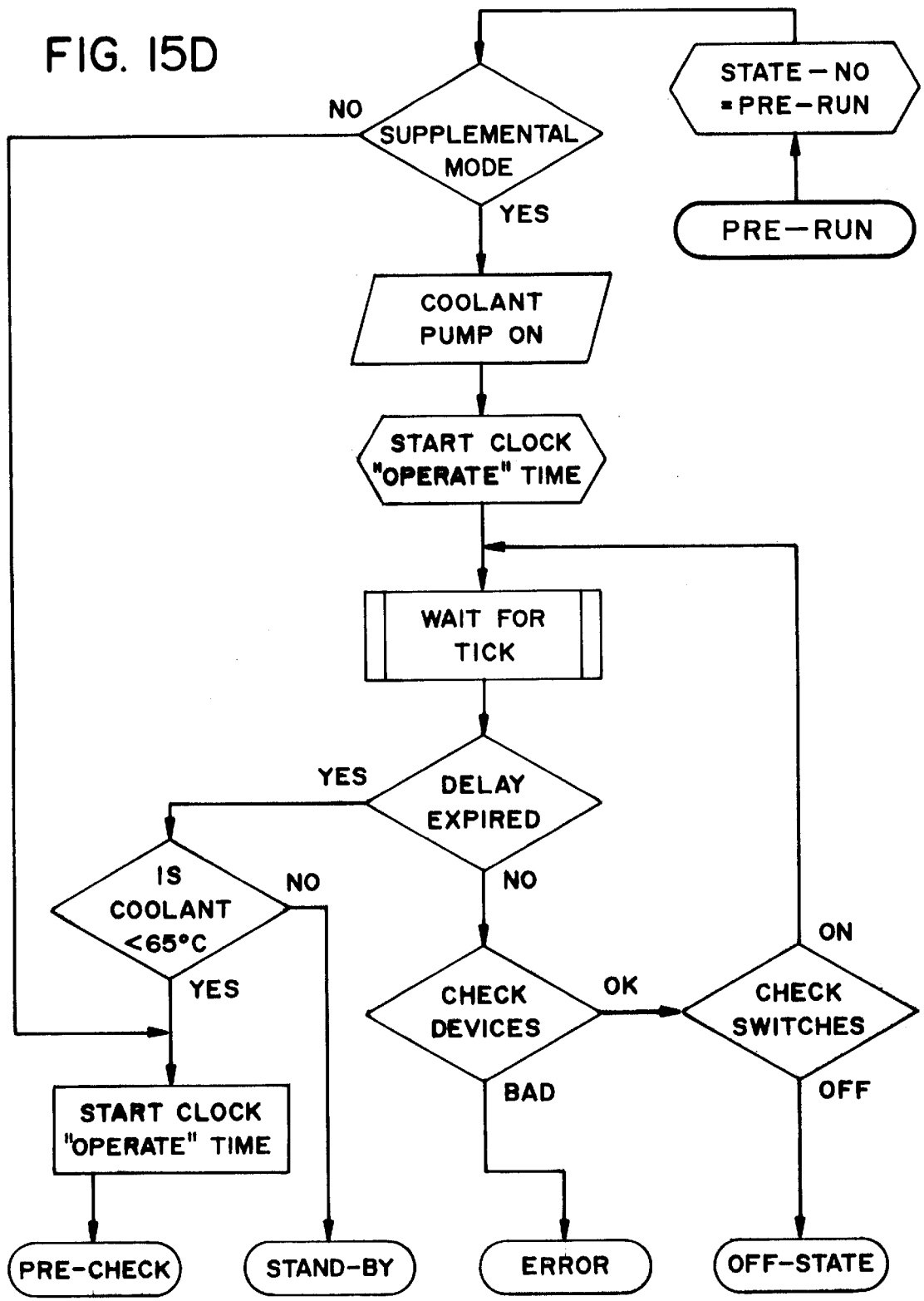
Figure 15E:
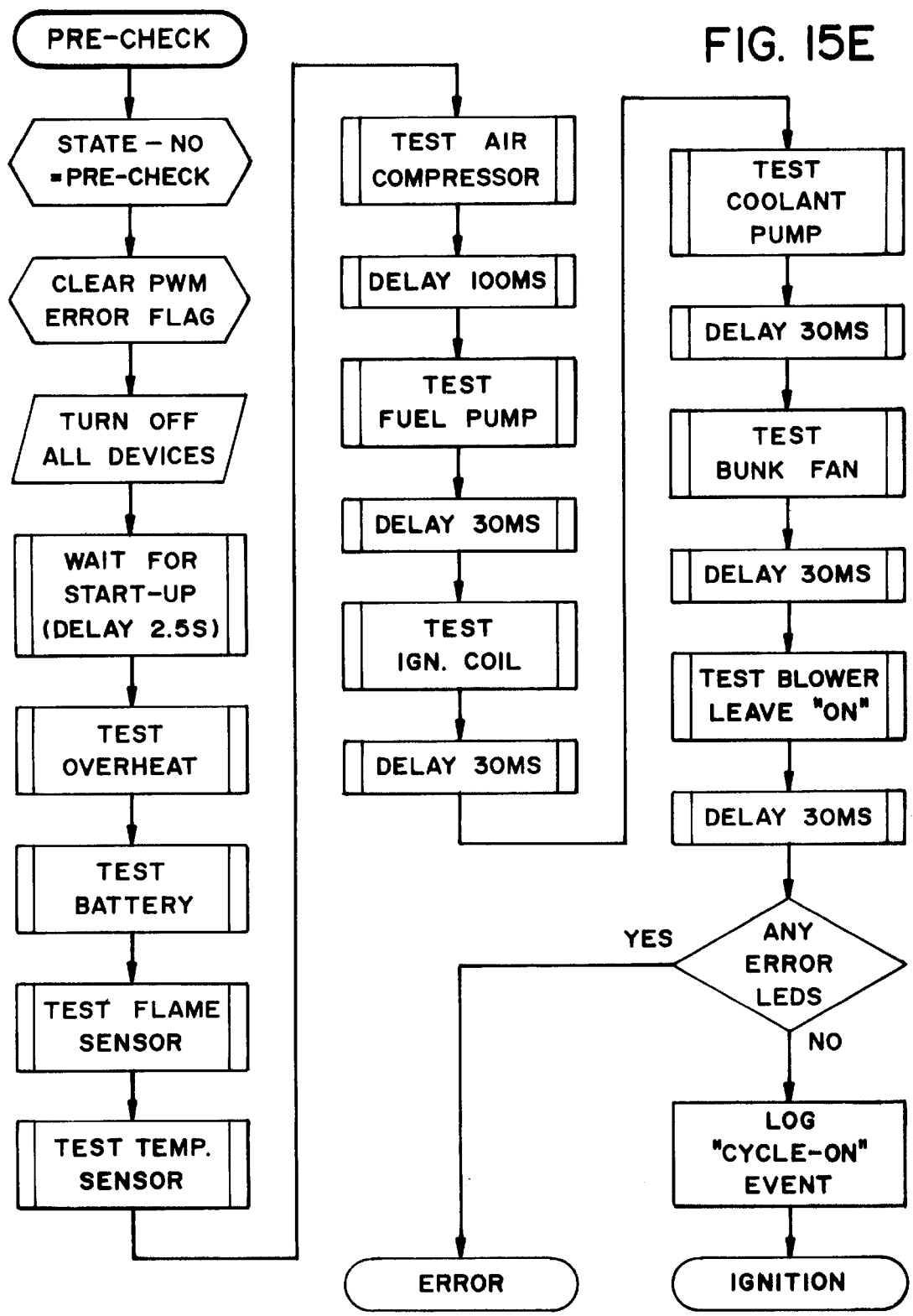
Figure 15F:
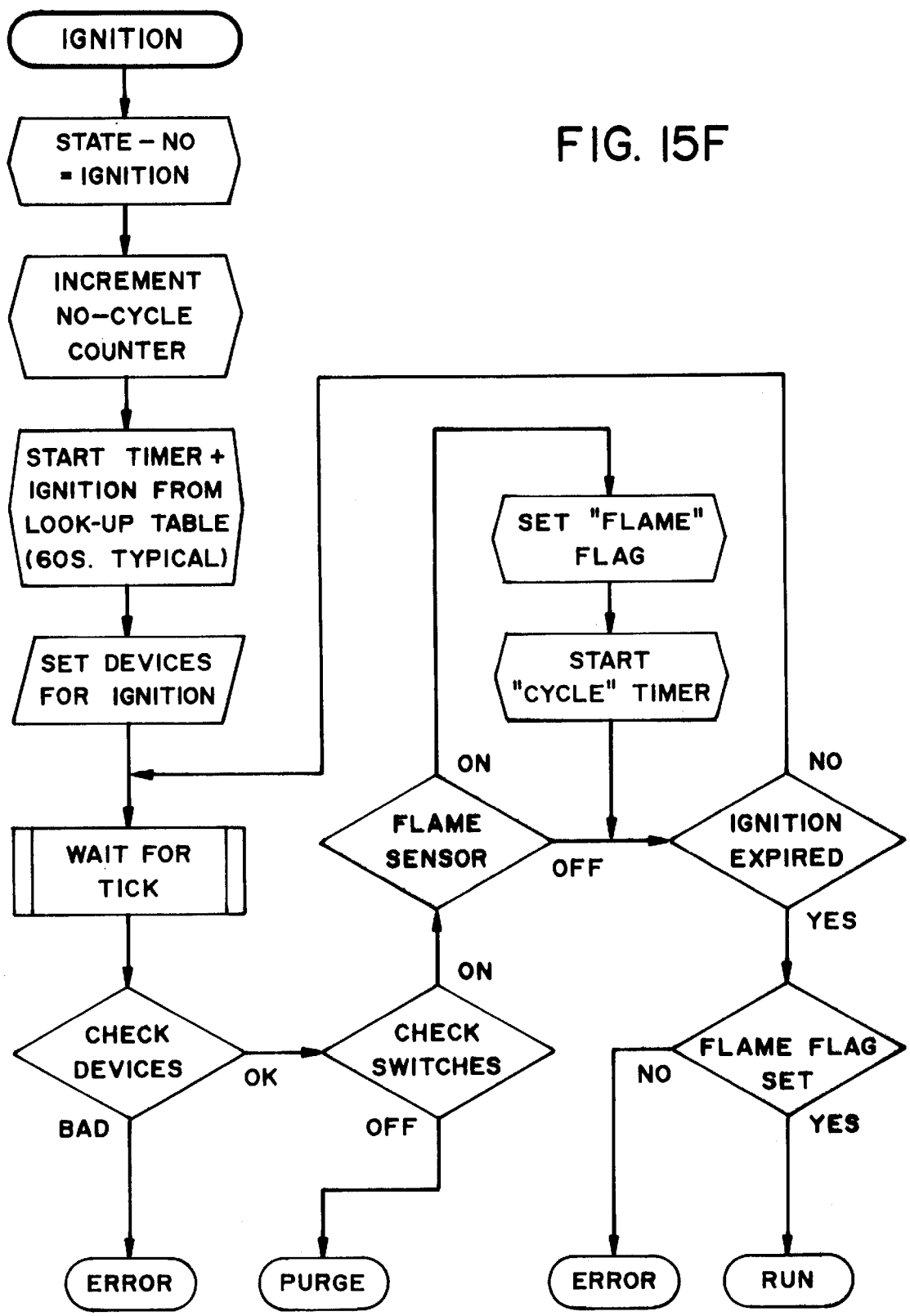
Figure 15G:
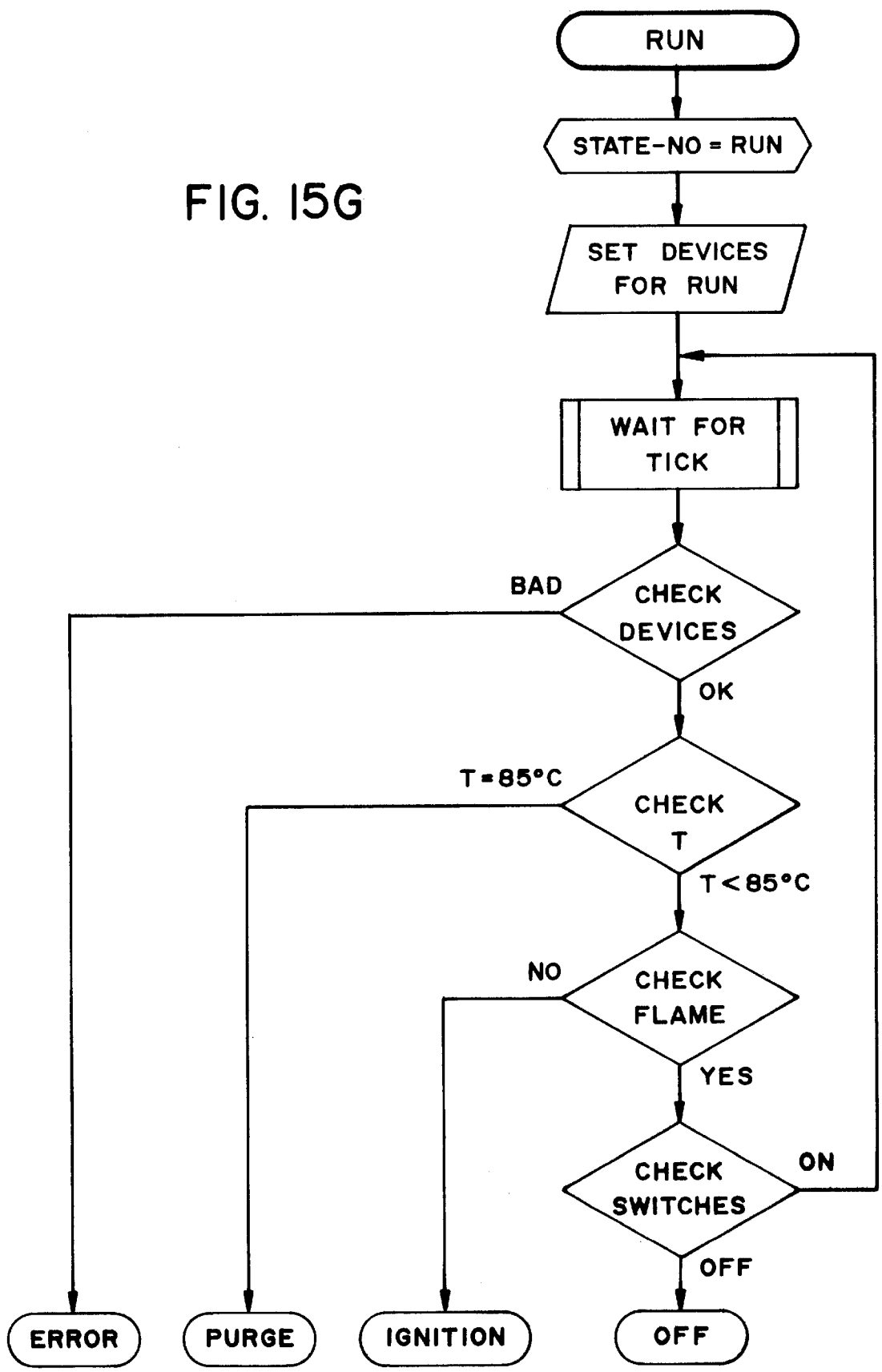
Figure 15H:
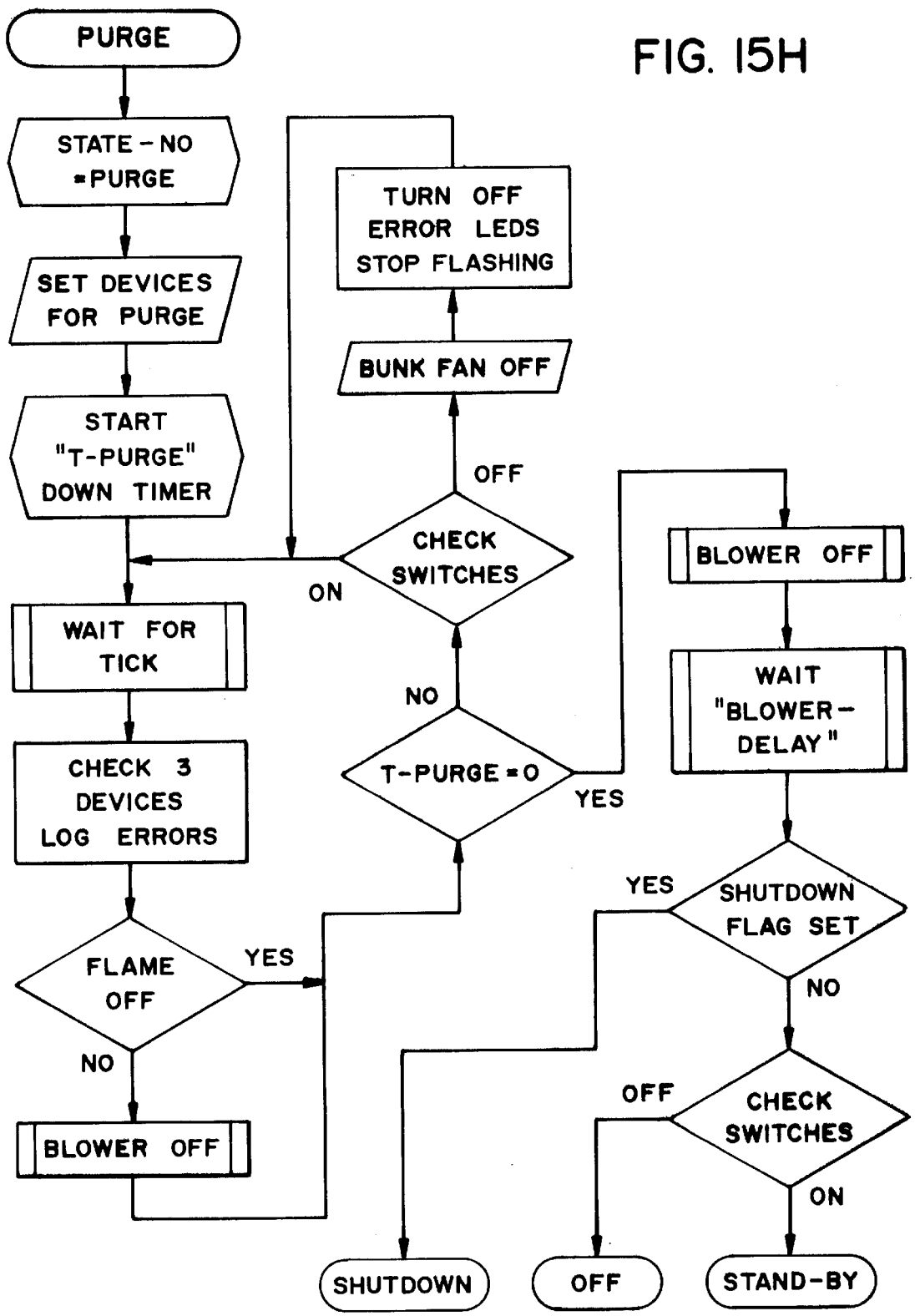
Figure 15I:
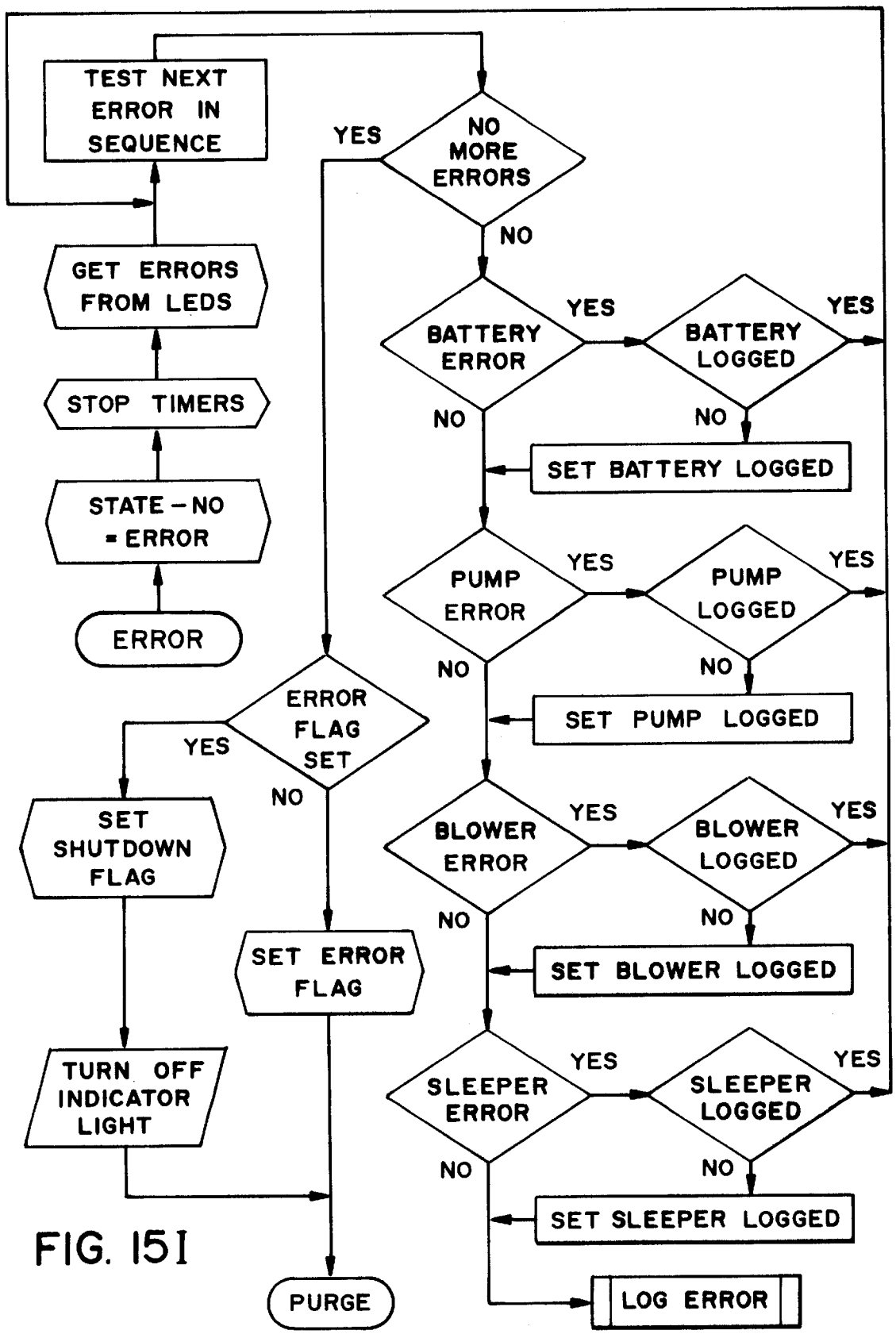
Figure 15J:
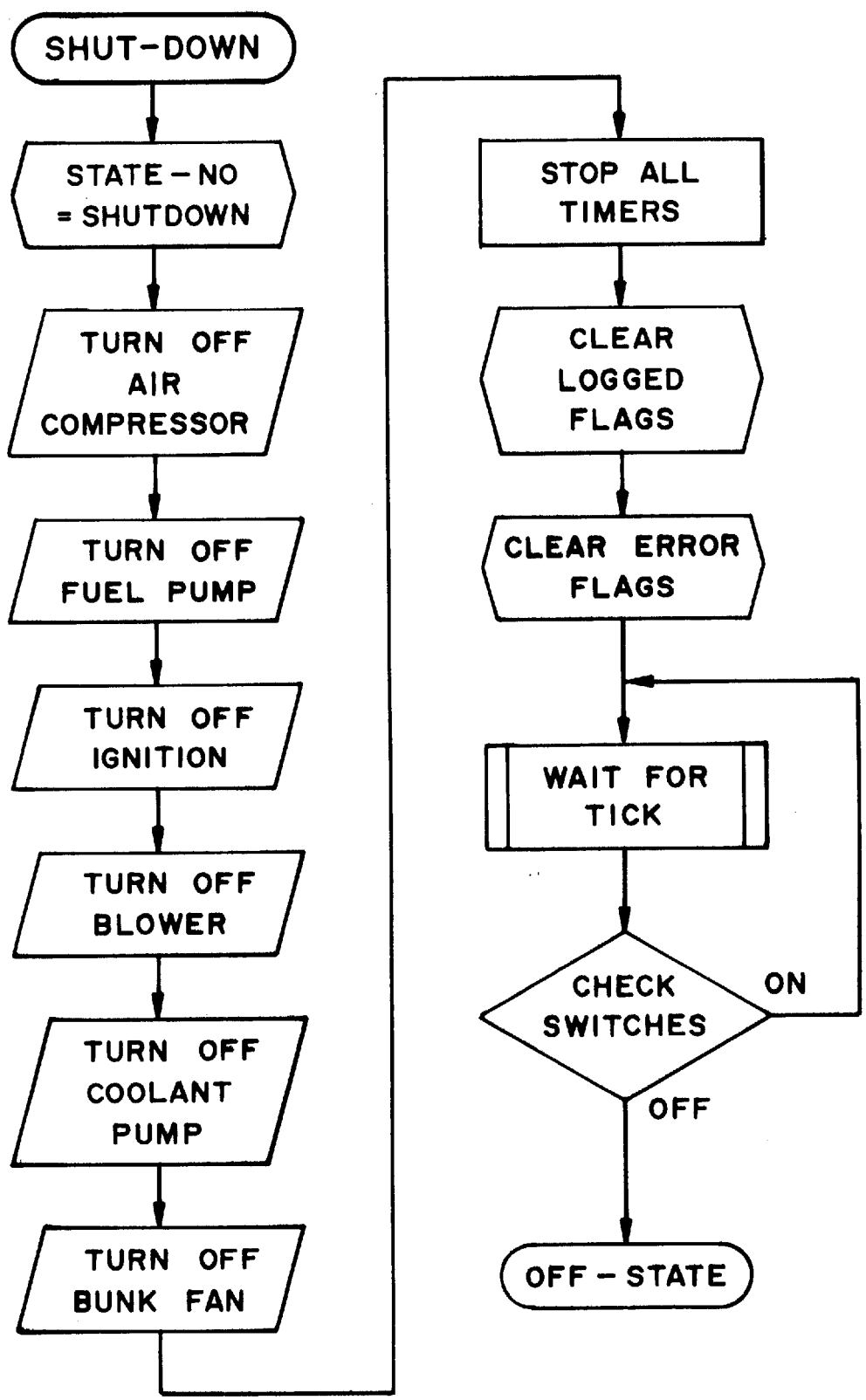

FIGS. 7 and 14 illustrate the controls and operation of controls for a combination of the Standard and Supplemental Run States with fully automatic operation. An external timer 141 is utilized which is connected to the main input 110. Auto input 112 is connected to the HVAC controls 17 and the engine monitor 15.

The heater is automatically started by the external timer 141. In the preferred embodiment this is a seven day timer that can be set for single days, 5, 6 and 7 days for activation twice per day. The timer will turn on the heater in Standard Run State where it runs for a predetermined duration as set by the timer. When the vehicle engine has started within the timer duration the heater automatically transfers to the Standard (Supplemental) State where operation is identical to the Standard Run State. The heater continues to preheat the vehicle engine. At the end of the timer duration, the heater automatically transfers to the Supplemental Run State. If the vehicle is not started within the timer duration, the heater shuts off. It may still enter the Supplemental Run State when the vehicle is started. This configuration allows the heater to perform its function without any driver input except for adjustment of the HVAC controls in some installations.

Full Function Heat State

In the mode, the remote radio receiver 146 and push button 144 are connected to the auxiliary input 114 as shown in FIG. 3. Timer 141, momentary push button 143, shown in FIG. 7, and toggle switch 140 are connected to the main input 110. The engine monitor and HVAC controls are connected to the auto input terminals as shown in FIG. 7.

This configuration allows both semi-automatic or fully automatic operation and is convenient if the vehicle usage is not on a consistent schedule and/or there is not enough notice given as to the vehicle usage. The addition of the momentary stop push button 143 on the main input allows for the manual preheat mode to be manually turned off when the momentary switch makes contact, the heater switches to the Standard Run State. When the momentary switch breaks contact, the heater switches to off.

Sub-States

The heater runs through several sub-states as it operates. The first of these is Pre-check. The heater performs a system check including checking all components for short circuits, checking all components for open circuits and checking for correct input signals from sensors. If all of the checks are positive, then the heater enters the Ignition Sub-state and operates the blower to provide combustion air, the fuel pump to provide fuel flow, the compressor to atomize the fuel, the ignition coil to ignite the combustion mixture and the coolant pump to circulate the system coolant. When the flame sensor indicates a flame, then the heater enters the Run Sub-state. In the Run Sub-state the heater runs the blower to provide combustion air, the fuel pump to provide fuel flow, the compressor to atomize the fuel and the coolant pump to circulate the system coolant. When the temperature sensor indicates a coolant temperature of 85° C., the heater enters a Purge Sub-state. In Purge, the heater operates the blower to purge exhaust gas from the combustion chamber and runs the coolant pump to circulate the system coolant. The heater stays in Purge for three minutes, then enters Standby.

In Standby, depending upon what state the heater is in, the heater may or may not run the coolant pump to circulate coolant. In the Preheat and Standard Run States, the heater runs the coolant pump to circulate the system coolant, monitors the temperature of the coolant via the temperature sensor and checks for fault in the above devices and monitors switch inouts. In the Supplement al Run State, the controls monitor the coolant temperature via the temperature sensor and checks for faults in the system. It monitors switch inputs.

The heater stays in Standby until its temperature sensor indicates a temperature of 65° C. The heater then enters Pre-check or Pre-run.

Pre-in is active only in the Supplemental Run State. In Pre-run, the coolant pump is run for three minutes. The heater then enters Pre-check. The controls continue to monitor the coolant temperature via the temperature sensor and checks for faults in the system. It monitors switch inputs. After three minutes, if the temperature is greater than a preset amount, 65° C. in this case, then the heater enters Standby State. After the three minutes, if the temperature is less than 65° C., then the heater enters Pre-Check.

If a fault is found at some point in the cycle, the heater enters the Purge Sub-state directly and displays the error indicator on a panel. After Purge it continues with Pre-Check and the rest of the cycle described above. If a second error is found before the heater has completed a temperature cycle, then the heater enters Shutdown.

In Shutdown, the heater displays any error indicators indefinitely and monitors switch inputs. The heater waits in this state until inputs are turned off. Only then will it enter the Off-state and be ready to operate again. In this way the heater has a built-in automatic shutoff which prevents it from continuously attempting to run and potentially damaging itself damaging the vehicle, or creating a safety hazard.

The heater has the ability to provide useful diagnostic information through its data log file maintained by the microcontroller. The heater logs its switched-on time, its flame time, its duty cycle and the number of cycles (temperature rises from 65° C. to 85° C. in this example). The heater logs its first and second temperature cycles, including associated times, sensor values, and system voltage. In addition it also logs all faults with their associated times, associated Sub-states and sensor values. If the heater turned off after only its first temperature cycle, then the second cycle information would not be recorded. The second cycle information is important in calculating the vehicle's coolant capacity and for further diagnosing system problems.

The heater's ability to automatically shut itself off after two consecutive errors is an important feature. If the heater experiences two fault conditions before it completes a temperature cycle, then it enters the Shutdown state where it disables itself and waits for an operator to reset it by turning off all its input devices. If the heater were turned off after only its first temperature cycle, then it is never able to enter Shutdown. Instead the heater is continuously reset and the fault will continuously occur. The fault may be particularly hazardous such as no ignition spark. In this case the heater attempts to light the fuel mixture for one minute before declaring a fault. A second attempt allows another minute worth of fuel into the combustion tube before the heater enters Shutdown. If the heater were turned off, then it would try to light the fuel mixture every time the vehicle's coolant temperature cycles. This may be dozens of times throughout the operation of the vehicle and may result in more and more fuel entering the combustion chamber, possibly leading to a fire hazard.

It will be understood that many of the details described above are by way of example only and are not intended to limit the scope of the invention which is to be interpreted with reference to the following claims.

What is claimed is:

1. An auxiliary vehicle heater for a vehicle with an interior, an engine and a vehicle interior heat exchange heated by engine coolant, the auxiliary heater comprising:

a burner;

a second heat exchanger;

a coolant pump connected to the second heat exchanger;

controls operatively connected to the burner and the coolant pump to operate the auxiliary heater in a first mode when the engine is stopped to preheat the engine or keep the engine warm and which shut off the heater in the first mode when the engine is running; and controls operatively connected to the burner and the coolant pump to operate auxiliary heater in a second made when the engine is running to improve heating of the vehicle interior.

2. An auxiliary heater as claimed in claim 1, wherein the controls to operate the heater in the second mode include automatic controls which monitor engine coolant temperature, the second controls causing the burner and pump to function when the engine is running and coolant temperature is below a preset second temperature.

3. An auxiliary heater as claimed in claim 2, wherein the controls stop the burner and pump functions when the engine is not running or when the coolant temperature is above the preset second temperature.

4. An auxiliary heater as claimed in claim 1, wherein the controls to operate the heater in the first mode include a timer which shuts off the burner and the pump after a preset period of time.

5. An auxiliary heater as claimed in claim 1, wherein the controls to operate the heater in the first mode a manual switch to initiate the first mode and a manual switch to stop the first mode.

6. An auxiliary heater as claimed in claim 1, wherein the controls to operate the heater in the second mode are automatic.

7. An auxiliary heater as claimed in claim 1, wherein the controls include a microprocessor and software.

8. An auxiliary heater as claimed in claim 1, wherein the controls include a timer which is external to the heater.

9. An auxiliary heater as claimed in claim 8, wherein the controls include a radio receiver.

10. An auxiliary vehicle heaters claimed in claim 3, wherein the controls to operate the heater in the second mode cause the pump to function for a preset period of time before the burner functions.

11. An auxiliary vehicle heater for a vehicle with an interior, an engine and a vehicle interior heat exchanger heated by engine coolant, auxiliary heater comprising:

a burner;

a second heat exchanger;

a coolant pump connected to the second heat exchanger; and controls operatively connected to the burner and the coolant pump to operate the auxiliary heater when the engine is running to improve heating of the vehicle interior, the controls including automatic controls which monitor engine coolant temperature, the controls causing the burner and pump to function when the engine is running and the coolant temperature is below a preset temperature, the controls stopping the burner and pump functions when the engine is not running or when the coolant temperature is above the preset temperature, wherein the controls turn on the coolant pump a preset period of time before turning on the burner.

12. A method of operating an auxiliary heater for a vehicle with an engine, an interior and a vehicle heater heated by engine coolant, the auxiliary heater including a burner, a heat exchanger, a coolant conduit connected to the heat exchanger and a coolant pump connected to the conduit, the method comprising the steps of:

operating the pump and the burner when the engine is running and the coolant temperature is below a preset temperature, the pump being turned on for a preset period of time prior to the burner; and stopping the burner and pump functioning when the engine is not running, when the coolant is above the present temperature.

13. A method as claimed in claim 12, wherein the burner and pump are operated for a preset period of time with the engine off.

14. An auxiliary vehicle heater for a vehicle having an interior, and engine and a vehicle interior heat exchanger heated by engine coolant, the auxiliary heater comprising:

a burner;

a second heat exchanger;

a coolant pump connected to the second heat exchanger; and controls operatively connected to the burner and the coolant pump, the controls selectively controlling the heater in a plurality of different operating modes depending on heating requirements, one of the modes being a standard mode where the burner and pump are operated when heat is required, and where the burner is shut off and the pump continues to operate when heat is not required, and a supplemental mode where the burner and pump operate when heat is required and where the burner and pump both shut off when heat is not required.

15. A heater as claimed in claim 14, wherein one of the modes is a preheat mode for preheating the engine and another of the modes is a mode for heating the vehicle interior.

16. A heater as claimed in claim 14, wherein the controls continue to monitor components and operative status of the heater in the supplemental mode when the burner and pump are shut off.

17. A heater as claimed in claim 14, wherein the controls shut the heater dowm after detecting two consecutive sysytem errors.

* * * * *